(12) United States Patent
Okumura et al.

(10) Patent No.: US 12,248,867 B2
(45) Date of Patent: Mar. 11, 2025

(54) DATA PROCESSING DEVICE FOR NEURAL NETWORK, METHOD OF OPERATING THE SAME, AND PROGRAM

(71) Applicant: RENESAS ELECTRONICS CORPORATION, Tokyo (JP)

(72) Inventors: Shunsuke Okumura, Tokyo (JP); Koichi Nose, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 1162 days.

(21) Appl. No.: 17/090,534

(22) Filed: Nov. 5, 2020

(65) Prior Publication Data

US 2021/0132866 A1    May 6, 2021

(30) Foreign Application Priority Data

Nov. 5, 2019 (JP) ................................. 2019-200609

(51) Int. Cl.
| | |
|---|---|
| *G06F 7/50* | (2006.01) |
| *G06F 3/06* | (2006.01) |
| *G06F 18/21* | (2023.01) |
| *G06N 3/04* | (2023.01) |
| *G06N 3/063* | (2023.01) |
| *G06V 10/94* | (2022.01) |

(52) U.S. Cl.
CPC ........... *G06N 3/063* (2013.01); *G06F 3/0604* (2013.01); *G06F 3/0659* (2013.01); *G06F 3/0673* (2013.01); *G06F 7/50* (2013.01); *G06F 18/2193* (2023.01); *G06N 3/04* (2013.01); *G06V 10/95* (2022.01); *G06V 10/955* (2022.01)

(58) Field of Classification Search
CPC ................................ G06F 7/50; G06F 18/2193
See application file for complete search history.

(56) References Cited

U.S. PATENT DOCUMENTS

2015/0127696 A1\* 5/2015 Igura ........................ H03H 9/46
708/300

OTHER PUBLICATIONS

Ryuji Kamiya et al., "Speeding-up of Identification Calculation and Model Compression by Binarized-DCNN", The Institute of Electronics, Information and Communication Engineers, Technical Committee on Pattern Recognition and Media Understanding, 2016, pp. 1-6.

\* cited by examiner

*Primary Examiner* — Michael D. Yaary
(74) *Attorney, Agent, or Firm* — Rimon P.C.

(57) ABSTRACT

A data processing device includes: an input data determining unit configured to determine whether or not each of binarized input data is a predetermined value; a storage unit configured to store a plurality of coefficients and coefficient address information including information related to coefficient addresses where the plurality of coefficients are stored; a control unit configured to read the coefficient address from the storage unit based on a determination result of the input data determining unit and read the coefficient from the storage unit based on the coefficient address; and an arithmetic unit configured to execute an arithmetic operation related to the coefficient acquired by the control unit.

20 Claims, 28 Drawing Sheets

FIG. 9

| INPUT DATA |
|---|
| 1 |
| 0 |
| 1 |
| 1 |
| 1 |
| 0 |
| 0 |
| 0 |
| 0 |
| 1 |
| 1 |
| 0 |
| 0 |
| 1 |
| 1 |

INPUT DATA SUCH AS IMAGE

| COEFFICIENT ADDRESS INFORMATION |
|---|
| 3 |
| 1 |
| 1 |
| 3 |
| 2 |
| 4 |
| 1 |
| 2 |
| 0 |
| 6 |
| 3 |
| 7 |
| 5 |
| 1 |
| 1 |
| 3 |

VALUE OBTAINED BY LEARNING AND FIXED VALUE

| COEFFICIENT ADDRESS | COEFFICIENT |
|---|---|
| 0 | −0.277900 |
| 1 | −0.479120 |
| 2 | −0.170720 |
| 3 | 0.376737 |
| 4 | 0.488618 |
| 5 | 0.492789 |
| 6 | −0.494450 |
| 7 | 0.090128 |

VALUE OBTAINED BY LEARNING AND FIXED VALUE

| INPUT DATA × COEFFICIENT | CUMULATIVE ADDITION VALUE |
|---|---|
| 0.376737 | 0.376737 |
| 0 | 0.376737 |
| −0.479120 | −0.102383 |
| 0.376737 | 0.274354 |
| −0.170720 | 0.103634 |
| 0 | 0.103634 |
| 0 | 0.103634 |
| 0 | 0.103634 |
| 0 | 0.103634 |
| 0 | 0.103634 |
| 0.376737 | 0.480371 |
| 0.090128 | 0.570499 |
| 0 | 0.570499 |
| 0 | 0.570499 |
| −0.479120 | 0.091379 |
| 0.376737 | 0.468116 |

RESULT OF MULTIPLE ACCUMULATION

FIG. 22

143 REFERENCE FREQUENCY ACCUMULATING UNIT

| COEFFICIENT ADDRESS | REFERENCE FREQUENCY | COEFFICIENT | AJUSTED COEFFICIENT |
|---|---|---|---|
| A0 | 10 | −0.79 | −0.66 |
| A1 | 23 | −0.46 | −0.33 |
| A2 | 30 | −0.31 | −0.18 |
| A3 | 162 | −0.13 | 0.00 |
| A4 | 43 | +0.11 | +0.24 |
| A5 | 21 | +0.40 | +0.53 |
| A6 | 14 | +0.56 | +0.69 |
| A7 | 3 | +0.81 | +0.94 |

MOST FREQUENT VALUE

DATA PROCESSING DEVICE FOR NEURAL NETWORK, METHOD OF OPERATING THE SAME, AND PROGRAM

CROSS-REFERENCE TO RELATED APPLICATIONS

The disclosure of Japanese Patent Application No. 2019-200609 filed on Nov. 5, 2019 including the specification, drawings and abstract is incorporated herein by reference in its entirety.

BACKGROUND

The present invention relates to a data processing device and its operating method and program, and relates to, for example, a data processing device configured to execute the multiple accumulation using a floating-point weight coefficient in the processing by a neural network and its operating method and program.

In recent years, there are some embedded devices that execute inference processing by artificial intelligence (AI). Various neural networks are used for the inference processing. Examples of the neural network include deep neural network (DNN), convolutional neural network (CNN), multi-layer perceptron, recurrent neural network, and others. In the inference processing by the neural network, a large-capacity memory and arithmetic operation resources are required in order to execute a large number of multiple accumulations.

As to the arithmetic operation resources, the multiplier has a larger circuit scale than the adder and consumes a large amount of power during the operation. Thus, a method has been proposed in which the floating-point addition is used instead of the floating-point multiple accumulation which requires a large amount of computation by changing the input data of the multiple accumulation matrix used in the operation of the neural network to the combination of some binary data.

On the other hand, as to the memory capacity, since the weight parameter is floating-point data, there is a problem that a large memory capacity is required to store the weight parameter. This is a big problem especially for embedded microcomputers and SoCs (System On Chips) that have limitation in memory capacity.

There is a disclosed technique below.
[Non-patent Document 1] Speeding-up of Identification Calculation and Model Compression by Binarized-DCNN, Technical Committee on Pattern Recognition and Media Understanding, 2016.

SUMMARY

According to Non-Patent Document 1, one coefficient information is given to one bit of basis information. Then, the original weight parameter is approximated by taking the sum of the values obtained by multiplying each of the H pieces of coefficient information (H is a natural number) by a value of 1 or −1. Therefore, there is a problem that the weight parameter that can be expressed is limited to the sum of combinations of plus (+) values or minus (−) values of H coefficients. For example, even if the number of pieces of basis information is doubled from H to 2H, the possible coefficient information is only doubled. Also, since the weight parameter that can be expressed is limited to the sum of those obtained by multiplying H pieces of coefficient information by +1 or by −1, the distribution of possible values of the weight parameter is limited to that symmetrical between the plus (+) side and the minus (−) side. In particular, when an input value of a distorted distribution is input to the neural network, distortion of the value distribution is accumulated every time the multiple accumulation is executed, and there is a problem that the recognition accuracy in the inference processing decreases.

An object of the embodiment is to realize the high recognition accuracy while suppressing the memory capacity required for the multiple accumulation in the inference processing of machine learning including the neural network. Other objects and novel features will be apparent from the description of the specification and the drawings.

A data processing device according to an embodiment comprises: an input data determining unit configured to determine whether or not each of binarized input data is a predetermined value; a storage unit configured to store a plurality of coefficients and coefficient address information including information related to coefficient addresses where the plurality of coefficients are stored; a control unit configured to read the coefficient address from the storage unit based on a determination result of the input data determining unit and read the coefficient from the storage unit based on the coefficient address; and an arithmetic unit configured to execute an arithmetic operation related to the coefficient acquired by the control unit.

An operating method of a data processing device according to another embodiment is an operating method of a data processing device having an arithmetic unit and a memory, and the method comprises: a step of determining whether or not binarized input data is a predetermined value; a step of storing a plurality of coefficients and coefficient address information including information related to coefficient addresses where the plurality of coefficients are stored, in the memory; a step of reading the coefficient address from the memory based on a determination result of the determining step; a step of reading the coefficient from the memory based on the coefficient address; and a step of executing an arithmetic operation based on the read coefficient by the arithmetic unit.

A computer readable storage medium storing a program according to another embodiment is a computer readable storage medium storing a program related to a neural network model executed by a data processing device having a CPU and a memory, and the computer readable storage medium storing the program causes a computer to execute processing comprising: a step of determining whether or not each of binarized input data is a predetermined value; a step of storing a plurality of coefficients and coefficient address information including information related to coefficient addresses including addresses where the plurality of coefficients are stored, in the memory; a step of reading the coefficient address from the memory; a step of reading the coefficient from the memory based on the coefficient address; and a step of executing a cumulative addition of the read coefficient.

According to an embodiment, the data processing device can realize the high recognition accuracy while suppressing the memory capacity in the inference processing of machine learning including the deep neural network.

BRIEF DESCRIPTION OF THE DRAWINGS

FIG. 9 is a diagram showing an example of a multiple accumulation processing performed by the data processing device according to the first embodiment;

FIG. 22 is an explanatory diagram of coefficient adjustment performed based on the most frequent coefficient address by the data processing device according to the fifth embodiment;

DETAILED DESCRIPTION

Figure 1:
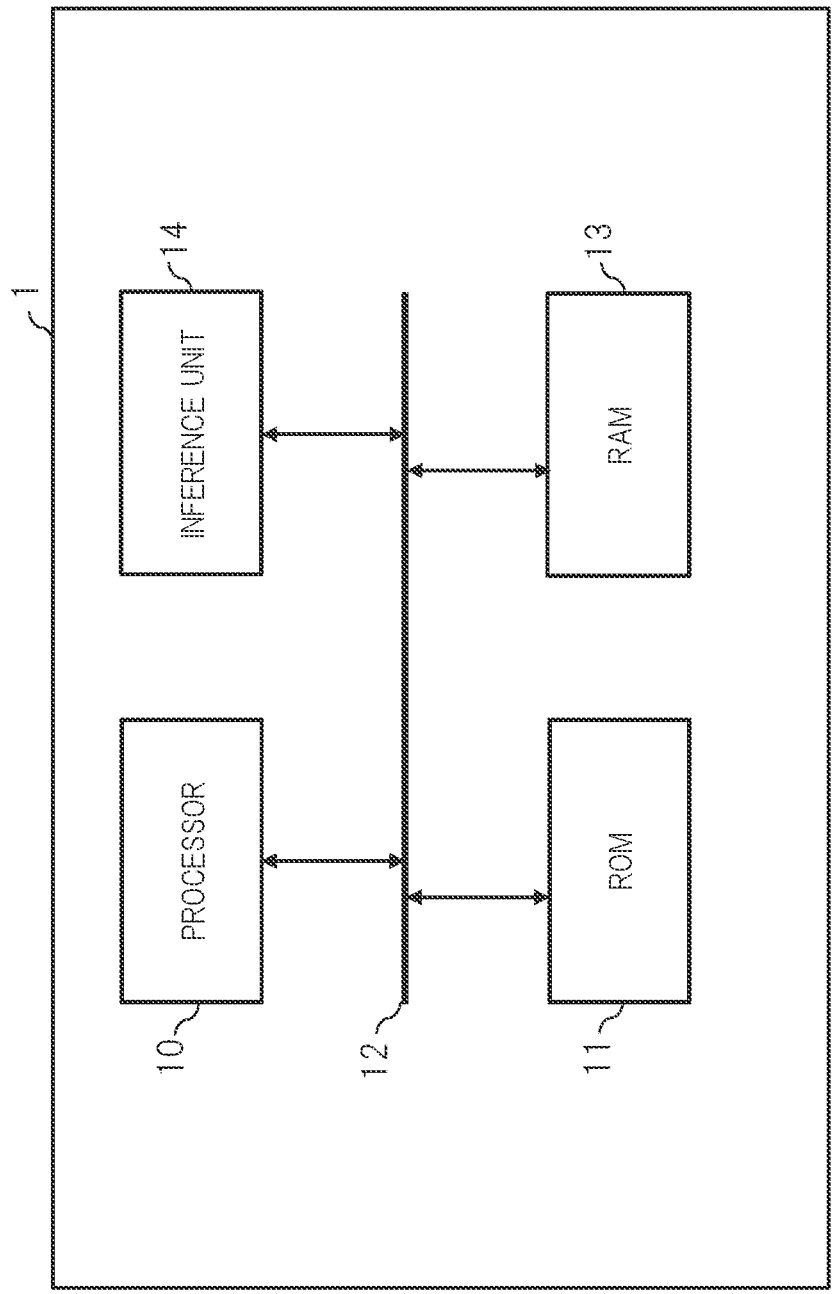
FIG. 1 is a block diagram showing a configuration example of a data processing device according to the first embodiment.

For clarity of explanation, the following description and drawings are omitted and simplified as appropriate. In addition, each element described in the drawings as a functional block to perform various processes can be configured of a CPU (Central Processing Unit), a memory, and other circuits in terms of hardware, and can be realized by a program or the like loaded in a memory in terms of software. Therefore, it is understood by those skilled in the art that these functional blocks can be realized in various forms by only hardware, only software, or a combination thereof, and they are not limited to any of them. In each drawing, the same elements are denoted by the same reference characters, and redundant description is omitted as necessary.

Also, the above-described program is stored using various types of non-transitory computer readable medium and can be supplied to the computer. The non-transitory computer readable medium includes various types of substantive storage medium. Examples of the non-transitory computer readable medium include magnetic storage medium (e.g., flexible disk, magnetic tape, hard disk drive), magneto-optical storage medium (e.g., magneto-optical disk), CD-ROM (Read Only Memory), CD-R, CD-R/W, and semiconductor memory (e.g., Mask ROM, PROM (Programmable ROM), EPROM (Erasable PROM), Flash ROM, RAM (Random Access Memory)). The program may be supplied to the computer by various types of transitory computer readable medium. Example of the transitory computer readable medium include electrical signals, optical signals, and electromagnetic waves. The transitory computer readable medium can supply the program to the computer via a wired communication path such as an electric wire and an optical fiber or a wireless communication path.

First Embodiment (Configuration)

FIG. 1 is a block diagram showing a configuration example of a data processing device 1 according to the first embodiment. As shown in FIG. 1, the data processing device 1 includes a processor 10, a ROM 11, a bus 12, a RAM 13, and an inference unit 14. For example, the data processing device 1 can be configured as a semiconductor device.

The processor 10 is a processing circuit that performs the arithmetic processing by executing the program (instruction stream) read from the ROM 11 or the like via the bus 12. For example, the processor is a CPU, a DSP (Digital Signal Processor), or the like.

The ROM 11 is a storage device that stores the program to be executed by the processor 10. For example, the ROM 11 stores a program related to a deep neural network obtained by performing machine learning of deep learning and a program for controlling the inference unit 14. Although the ROM 11 is incorporated in the data processing device 1 in FIG. 1, the data processing device 1 may be configured to perform the processing by reading the program from a storage device provided outside the data processing device 1. Further, the storage device that stores the program may be both the ROM 11 incorporated in the data processing device 1 and the storage device provided outside the data processing device 1.

The bus 12 is a signal path that connects the processor 10, the ROM 11, the RAM 13, and the inference unit 14 to exchange data. The processor 10 and the inference unit 14 access the ROM 11 or the RAM 13 via the bus 12.

The RAM 13 is a storage device (storage unit) that stores data for the processor 10 and the inference unit 14 to perform the arithmetic processing. The inference unit 14 can store temporary data or the like required for the operation of the neural network in the RAM 13.

The inference unit 14 performs inference processing using a neural network. An example of the neural network processed by the inference unit 14 is a deep neural network (DNN), but the neural network is not limited to this. For example, the neural network may be CNN or RNN.

Although FIG. 1 shows a configuration example provided with the inference unit 14, the configuration of the date processing device 1 is not limited to this. Namely, the data processing device 1 may be configured such that the inference unit 14 is realized as software and the program is stored in the ROM 11. Also, the inference unit 14 may have a storage device such as a ROM or a RAM therein separately from the ROM 11 and the RAM 13.

Figure 2:
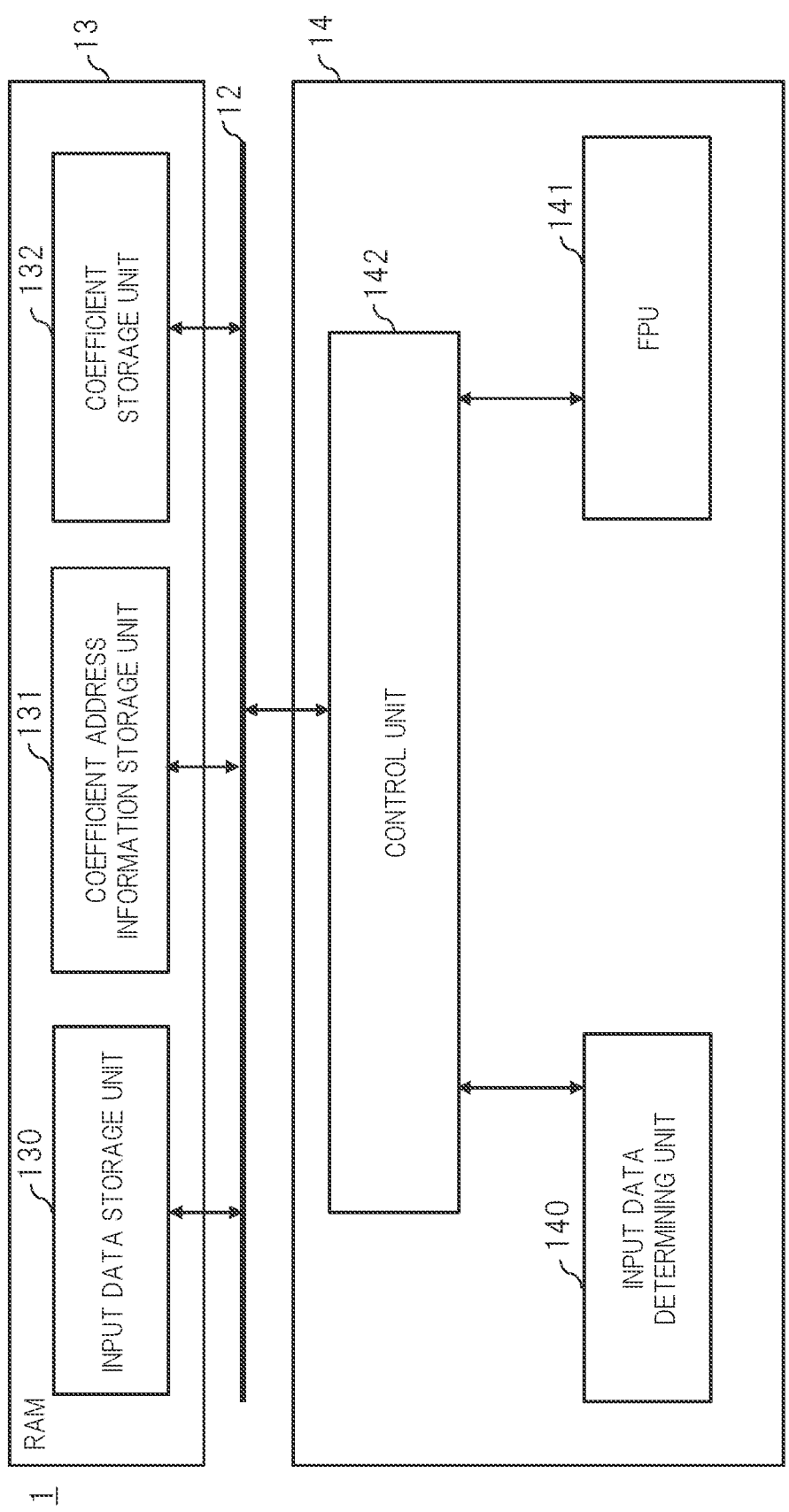
FIG. 2 is a circuit diagram showing a configuration example of an inference unit and a storage device of the data processing device according to the first embodiment.

FIG. 2 is a diagram showing a configuration example of the inference unit 14 and the RAM 13 according to the first embodiment. As shown in FIG. 2, the inference unit 14 includes an input data determining unit 140, a floating point unit (FPU) 141, and a control unit 142. Also, the RAM 13 includes an input data storage unit 130, a coefficient address information storage unit 131, and a coefficient storage unit 132. Although FIG. 2 shows the configuration in which the coefficient address information storage unit 131 and the coefficient storage unit 132 are provided in the RAM 13, the configuration of the coefficient address information storage unit 131 and the coefficient storage unit 132 is not limited to this. For example, the configuration in which the coefficient address information storage unit 131 and the coefficient storage unit 132 are provided in the ROM 11 is also possible.

Figure 3:
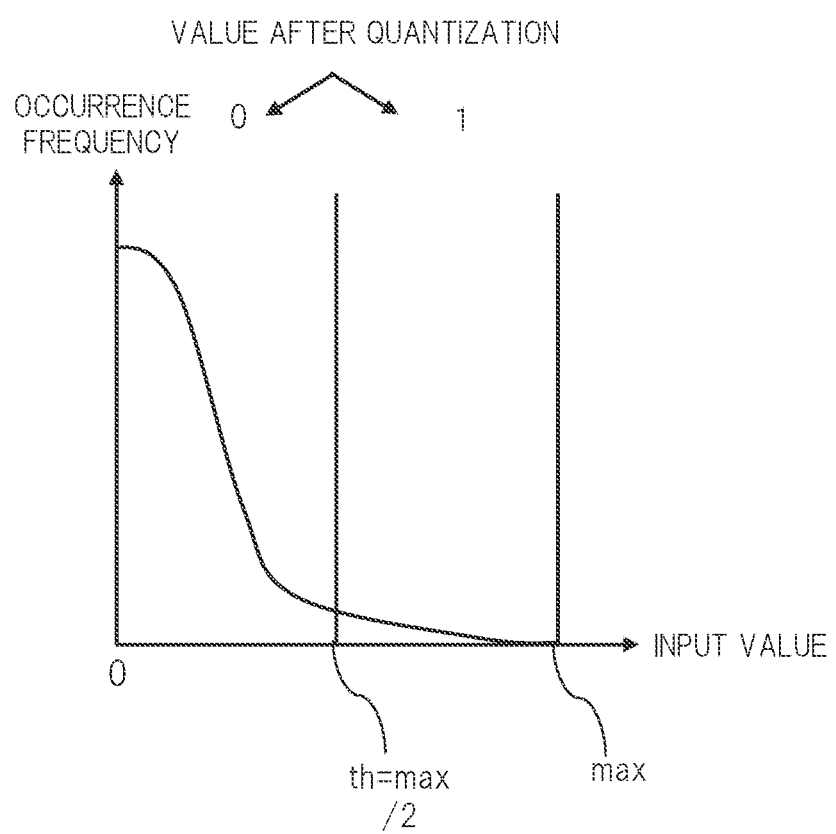
FIG. 3 is an explanatory diagram of binarized input data stored in an input data storage unit of the data processing device according to the first embodiment.

The input data storage unit 130 is a storage unit that stores binarized input data for performing the inference by neural network. The data input to the neural network is floating-point data. The input floating-point data is quantized to 1-bit digital value by a quantizing unit (not shown) and is stored as binarized input data in the input data storage unit 130. In other words, the floating-point input data input to the neural network is quantized to a value of 0 or 1 and is stored in the input data storage unit 130. FIG. 3 is a diagram showing an example in which the floating-point input data is quantized to the binarized input data. In the example shown in FIG. 3, the input value is distributed in the value from 0 to max. In the example shown in FIG. 3, a value of 0 or more and less than th=max/2 is quantized to 0, and a value of th=max/2 or more and equal to or less than max is quantized to 1. In the example of quantization shown in FIG. 3, the threshold value for binarization is th=max/2, but the method of quantizing to binarized input data is not limited to this. For example, the input data can be quantized to binary data with setting the threshold value to th=max/4. When the threshold value is th=max/4, a value of 0 or more and less than th=max/4 is quantized to 0, and a value of th=max/4 or more and equal to or less than max is quantized to 1.

With reference to FIG. 2 again, the coefficient address information storage unit 131 is a storage unit in which information related to a coefficient address that is an address where a coefficient of the neural network is stored (hereinafter, referred to as "coefficient address information") is stored. In this case, the coefficient address is an address value of the coefficient stored in the coefficient storage unit 132. When the coefficient address is composed of K bits (K is a natural number), a maximum of 2K different coefficients can be identified. In other words, the inference unit 14 can use up to 2K different coefficients as the coefficients of the neural network. On the other hand, the coefficient address information includes one or a plurality of coefficient addresses and also includes information regarding the use order (operation order) of the one or a plurality of coefficient addresses. In other words, the coefficient address information includes information composed of one or a plurality of coefficient addresses in correspondence with the fact that each of one or a plurality of input data and each of one or a plurality of weigh parameters are multiplied in the multiple accumulation regarding the neural network. Therefore, the coefficient address information includes information regarding to which input data one or a plurality of coefficients are multiplied. The coefficient address information can be expressed as, for example, an array of one or more coefficient addresses. Specific examples of the coefficient address and the coefficient address information will be described in detail with reference to FIG. 5.

The coefficient storage unit 132 is a storage unit in which the coefficients of the neural network are stored.

The input data determining unit 140 determines whether or not the binarized input data is a predetermined value. More specifically, the input data determining unit 140 determines whether or not the binarized input data is 1 which is the predetermined value.

The FPU 141 is an arithmetic circuit that executes the operation related to the floating point. As described later, the FPU 141 executes the multiple accumulation of the input data and the coefficient by executing the cumulative addition of the coefficients read from the coefficient storage unit 132.

The control unit 142 is a control circuit that controls transmission and reception of the binarized input data, the coefficient address, and the coefficient among the input data storage unit 130, the coefficient address information storage unit 131, the coefficient storage unit 132, the input data determining unit 140, and the FPU 141. More specifically, the control unit 142 reads the binarized input data from the input data storage unit and transmits the read input data to the input data determining unit 140. Also, the control unit 142 reads the coefficient address from the coefficient address information storage unit 131 based on the determination result by the input data determining unit 140 that the input data is 1. Further, the control unit 142 reads the coefficient from the coefficient storage unit 132 based on the read coefficient address and transmits the coefficient to the FPU 141.

After reading all the input data and executing the cumulative addition, the control unit 142 stores the result of cumulative addition in the FPU 141 in the RAM 13 as the multiple accumulation result.

(Operation)

In the data processing device 1 according to the first embodiment, learning is performed using the learning data prior to the inference processing by the neural network, and the optimum weight parameter is obtained. In the data processing device 1 according to the first embodiment, representative L (L is a natural number) coefficients are selected from the distribution of weight parameter obtained during the learning. The selected L coefficients are stored in the coefficient storage unit 132. Here, the L coefficients are floating-point data. Further, in the data processing device 1 according to the first embodiment, the coefficient address information that is the information related to the coefficient addresses of the L coefficients is stored in the coefficient address information storage unit 131. For example, the coefficient address is a relative address with respect to the base address of the coefficient storage unit 132. By using the value of the relative address as the coefficient address, it is possible to express the L coefficient addresses with a smaller number of bits.

In the data processing device 1 according to the first embodiment, representative K values are selected in advance from the distribution of the weight parameter obtained by learning and stored in the coefficient storage unit 132. As described above, in the data processing device 1 according to the first embodiment, the weight parameter which is floating-point data is expressed using the combination of the coefficient stored in the coefficient storage unit 132 and the coefficient address information stored in the coefficient address information storage unit 131.

Figure 4:
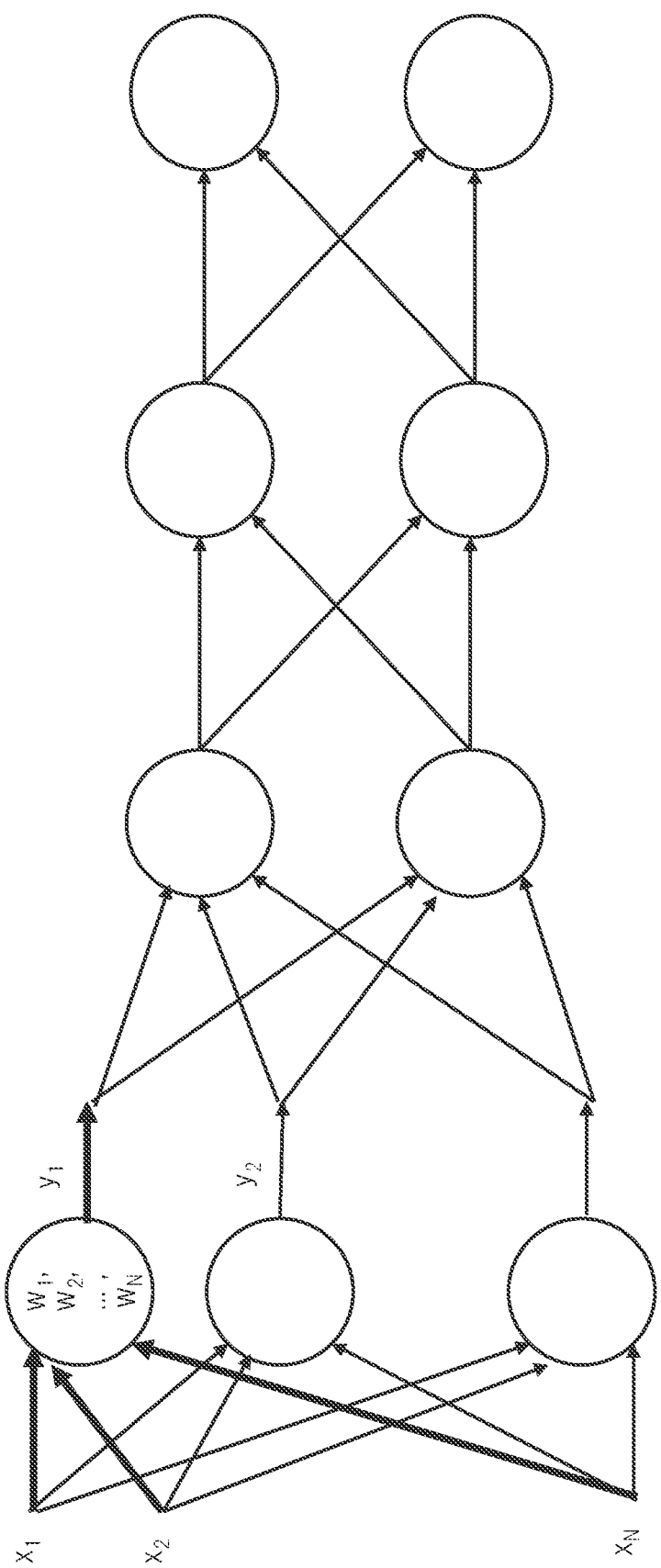
FIG. 4 is a diagram showing an example of processing of a neural network performed by the inference unit of the data processing device according to the first embodiment.

FIG. 4 is a diagram showing an example of the neural network used in the inference processing by the data processing device 1 according to the first embodiment. The neural network shown in FIG. 4 illustrates the inference processing executed by the inference unit 14. As shown in FIG. 4, output data y1 is calculated by obtaining multiplies of the input data and the weight parameters and obtaining the sum of the multiplies.

$$y_1 = \sum_{i=1}^{N} w_i x_i \quad \text{(Equation 1)}$$

As described above, in the neural network, a large number of multiple accumulations using the input data expressed by the floating point and the coefficient expressed by the floating point (hereinafter, referred to as "multiple accumulation by floating point") are executed, thereby calculating the output data. Since a large number of multiple accumulations by the floating point are executed in the inference processing, a large-capacity memory to store the floating-point data is necessary. Thus, in the data processing device 1 according to the first embodiment, the cumulative addition of coefficients is executed based on the binarized input data in place of the multiple accumulation by the floating point. In other words, the data processing device 1 according to the first embodiment can execute the operation corresponding to the multiple accumulation by the floating point by executing the cumulative addition of coefficients based on the binarized input data.

FIGS. 5 to 8 are diagrams showing the concept of the multiple accumulation required in the neural network in the data processing device 1 according to the first embodiment. FIGS. 5 to 8 show the four binarized input data (1 0 1 1) as an example of the binarized input data. Also, in FIGS. 5 to 8, the coefficient addresses are A0 to A7. Meanwhile, the coefficient address information is the information expressed by (A0 A3 A2 A1) in FIGS. 5 to 8. Of the coefficient addresses A0 to A7, the coefficient addresses used in the multiple accumulation shown in FIGS. 5 to 8 are A0, A1, A2, and A3. The coefficient address information includes the information of the combination of the coefficient addresses corresponding to the coefficients used in the individual specific multiple accumulation. The coefficient address information further includes the information related to the reading order of the coefficient addresses in correspondence with the operation order of the coefficients in the multiple accumulation. In other words, when the coefficient address information includes a plurality of coefficient addresses, the plurality of coefficient addresses included in the coefficient address information are arrayed so as to be read in accordance with the predetermined order.

The coefficient address information will be described more specifically with reference to FIGS. 5 to 8. In FIGS. 5 to 8, the coefficient address A0 is an address where the coefficient multiplied to the 1 on far left (first input data) of (1 0 1 1) is stored. The coefficient address A3 is an address where the coefficient multiplied to the 0 on second from left (second input data) of (1 0 1 1) is stored. The coefficient address A2 is an address where the coefficient multiplied to the 1 on third from left (third input data) of (1 0 1 1) is stored. The coefficient address A1 is an address where the coefficient multiplied to the 1 on fourth from left (fourth input data) of (1 0 1 1) is stored. (A0 A3 A2 A1) is determined in advance by the model of the neural network shown in FIG. 4. (1 0 1 1) and (A0 A3 A2 A1) each have four elements. Hereinafter, the coefficient address information, that is, the array of the coefficient addresses is regarded as a matrix, and is referred to also as "coefficient address matrix". For example, (A0 A3 A2 A1) is a 1×4 coefficient address matrix. Note that, in FIGS. 5 to 8, the 1×4 coefficient address matrix is shown as an example of the coefficient address matrix, but the number of components of the coefficient address matrix is not limited to this. The coefficient address matrix may be a 1×N matrix (N is a natural number).

Figure 5:
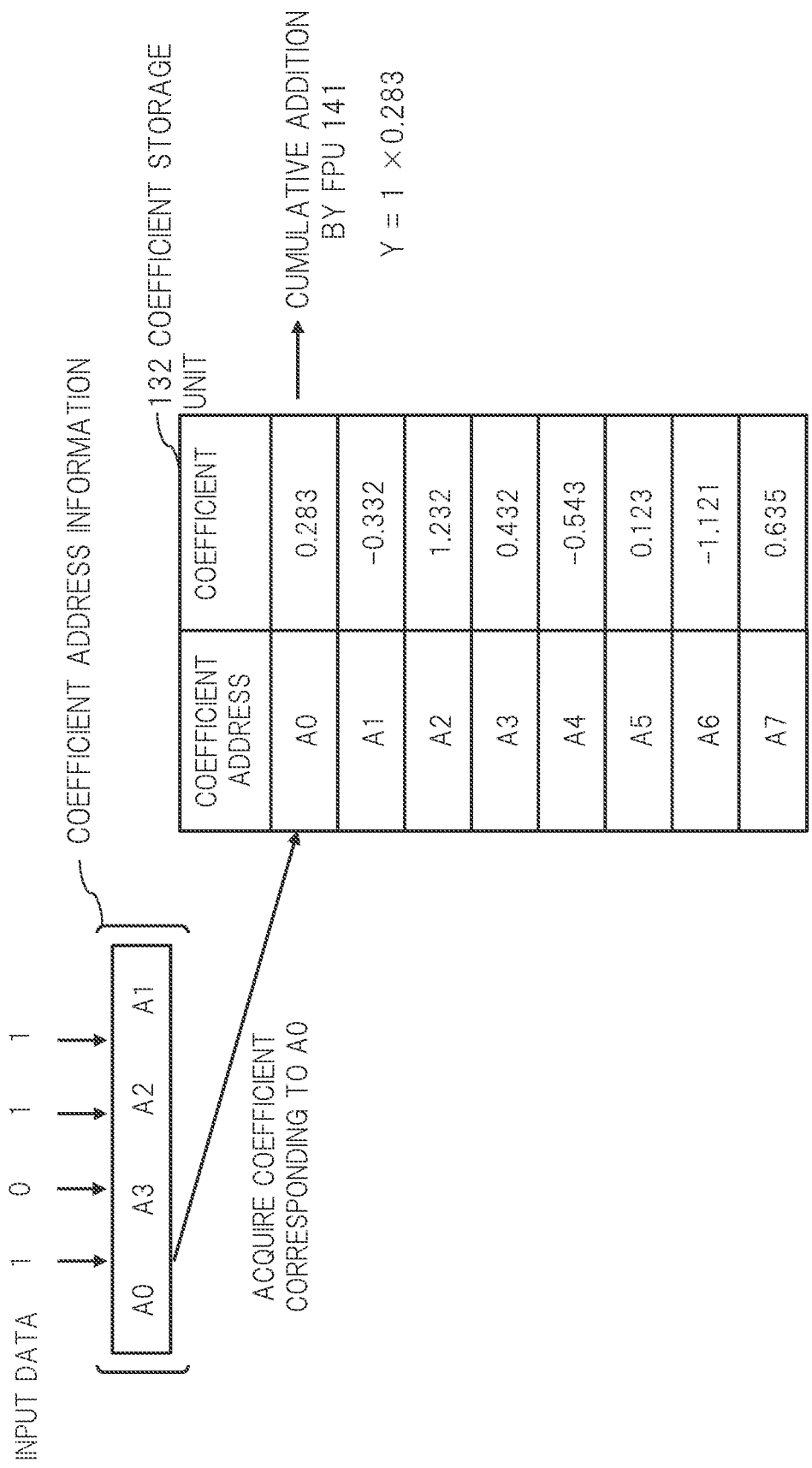
FIG. 5 is a diagram showing an example of a multiple accumulation for a first input data by the data processing device according to the first embodiment.

When executing the multiple accumulation of four binarized input data and coefficients, the control unit 142 first reads the 1 which is the binarized input data on far left of (1 0 1 1) from the input data storage unit 130 as shown in FIG. 5. The input data determining unit 140 determines that the binarized input data read from the input data storage unit 130 is 1 which is a predetermined value. The control unit 142 reads the coefficient address A0 from the coefficient address information storage unit 131 based on the determination result of the input data determining unit 140. Then, the control unit 142 reads the coefficient 0.283 corresponding to the address A0 from the coefficient storage unit 132 based on the coefficient address A0. The coefficient 0.283 read from the coefficient storage unit 132 by the control unit 142 is input to the FPU 141 by the control unit 142 and cumulatively added by the FPU 141.

Figure 6:
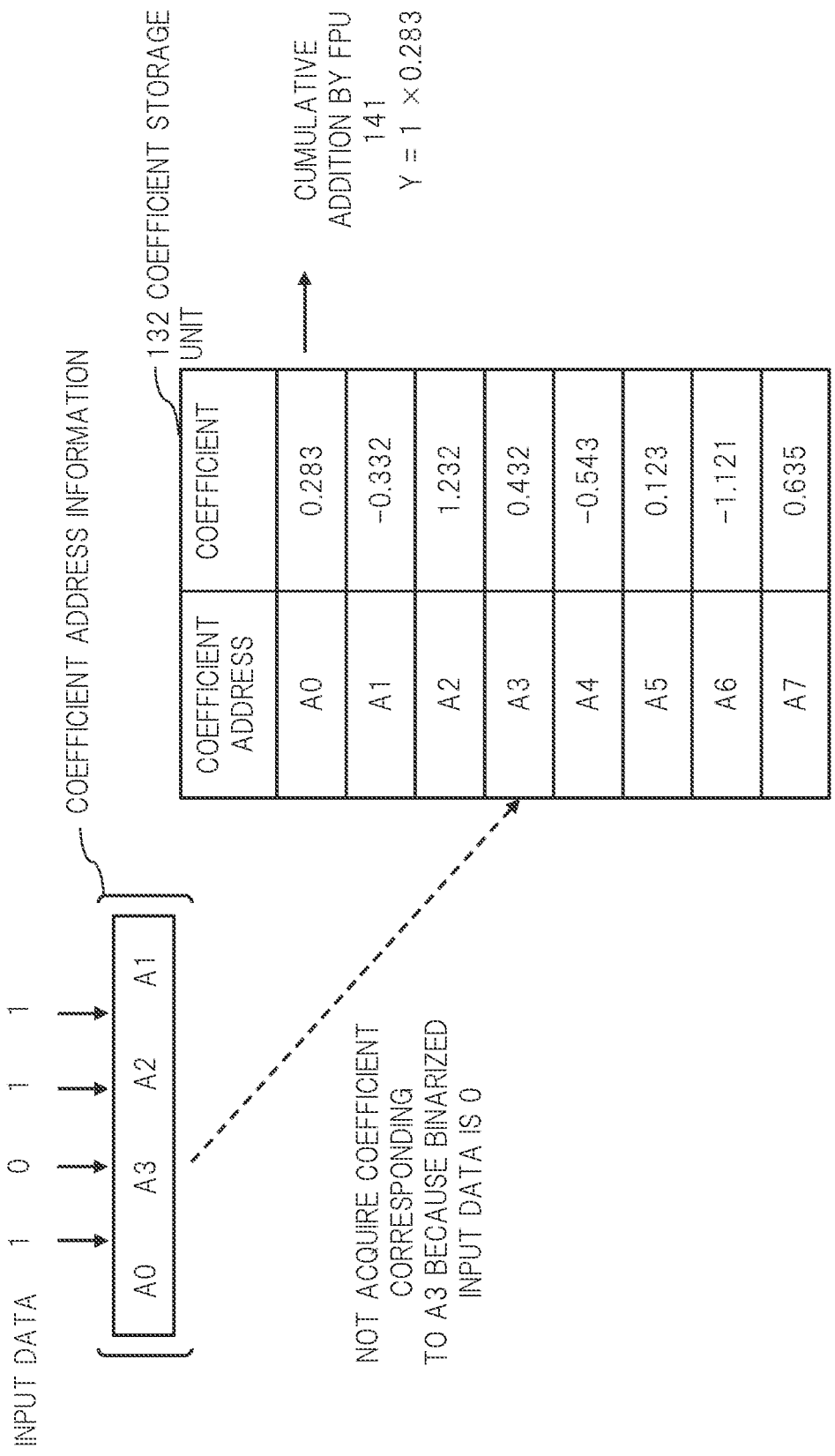
FIG. 6 is a diagram showing an example of a multiple accumulation for a second input data by the data processing device according to the first embodiment.

Next, as shown in FIG. 6, the control unit 142 reads the 0 which is the binarized input data on second from left of (1 0 1 1) from the input data storage unit 130. The input data determining unit 140 determines that the binarized input data is not 1 which is the predetermined value. The control unit 142 performs the control not to read the coefficient address (A3) from the coefficient address information storage unit 131 based on the determination result of the input data determining unit 140.

Figure 7:
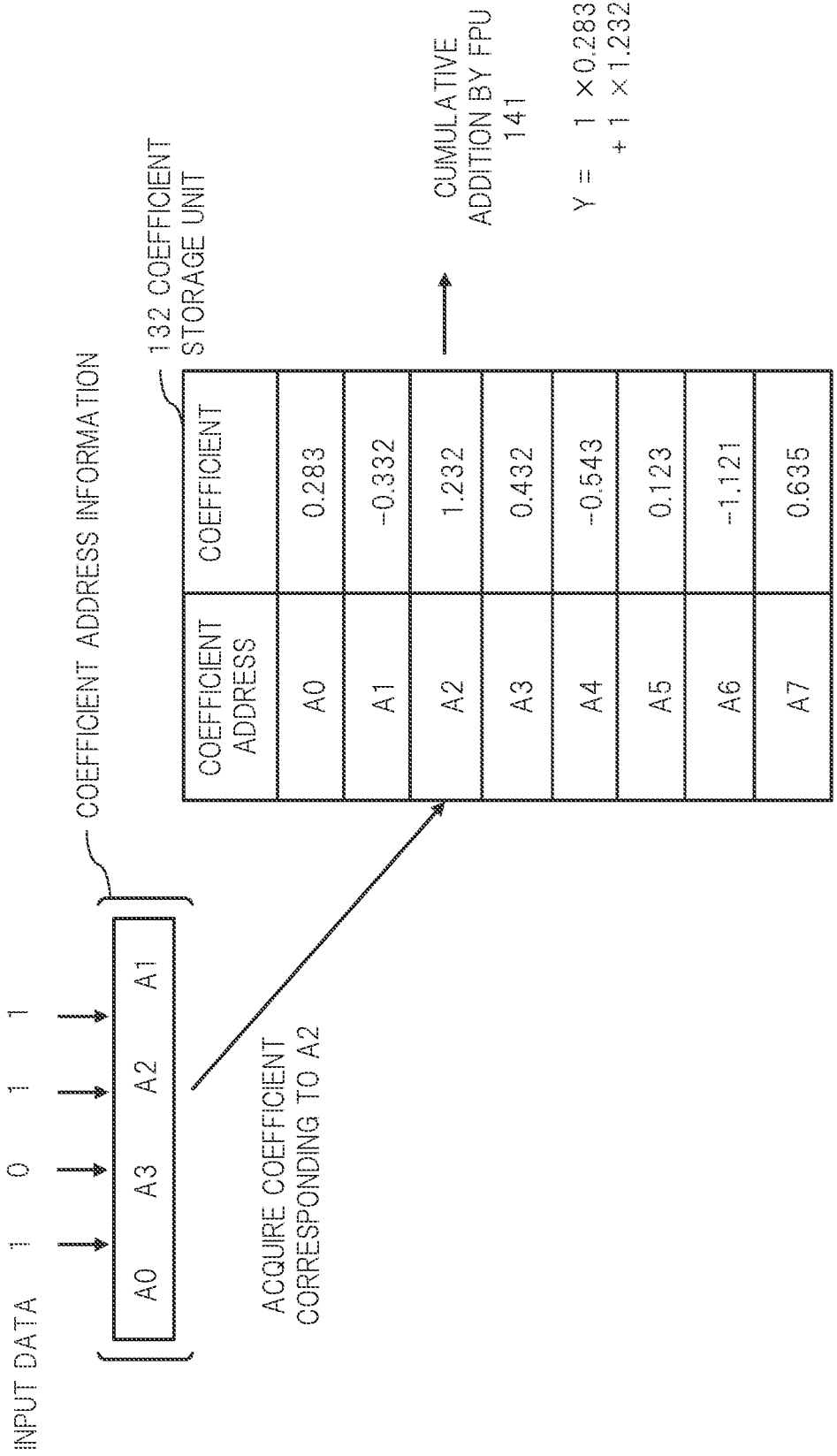
FIG. 7 is a diagram showing an example of a multiple accumulation for a third input data by the data processing device according to the first embodiment.

Subsequently, as shown in FIG. 7, the control unit 142 reads the 1 which is the binarized input data on third from left of (1 0 1 1) from the input data storage unit 130. The input data determining unit 140 determines that the binarized input data read from the input data storage unit 130 is 1 which is the predetermined value. The control unit 142 reads the coefficient address A2 from the coefficient address information storage unit 131 based on the determination result of the input data determining unit 140. Then, the control unit 142 reads the coefficient 1.232 corresponding to the address A2 from the coefficient storage unit 132 based on the coefficient address A2. The coefficient 1.232 read from the coefficient storage unit 132 by the control unit 142 is input to the FPU 141 by the control unit 142 and cumulatively added by the FPU 141.

Figure 8:
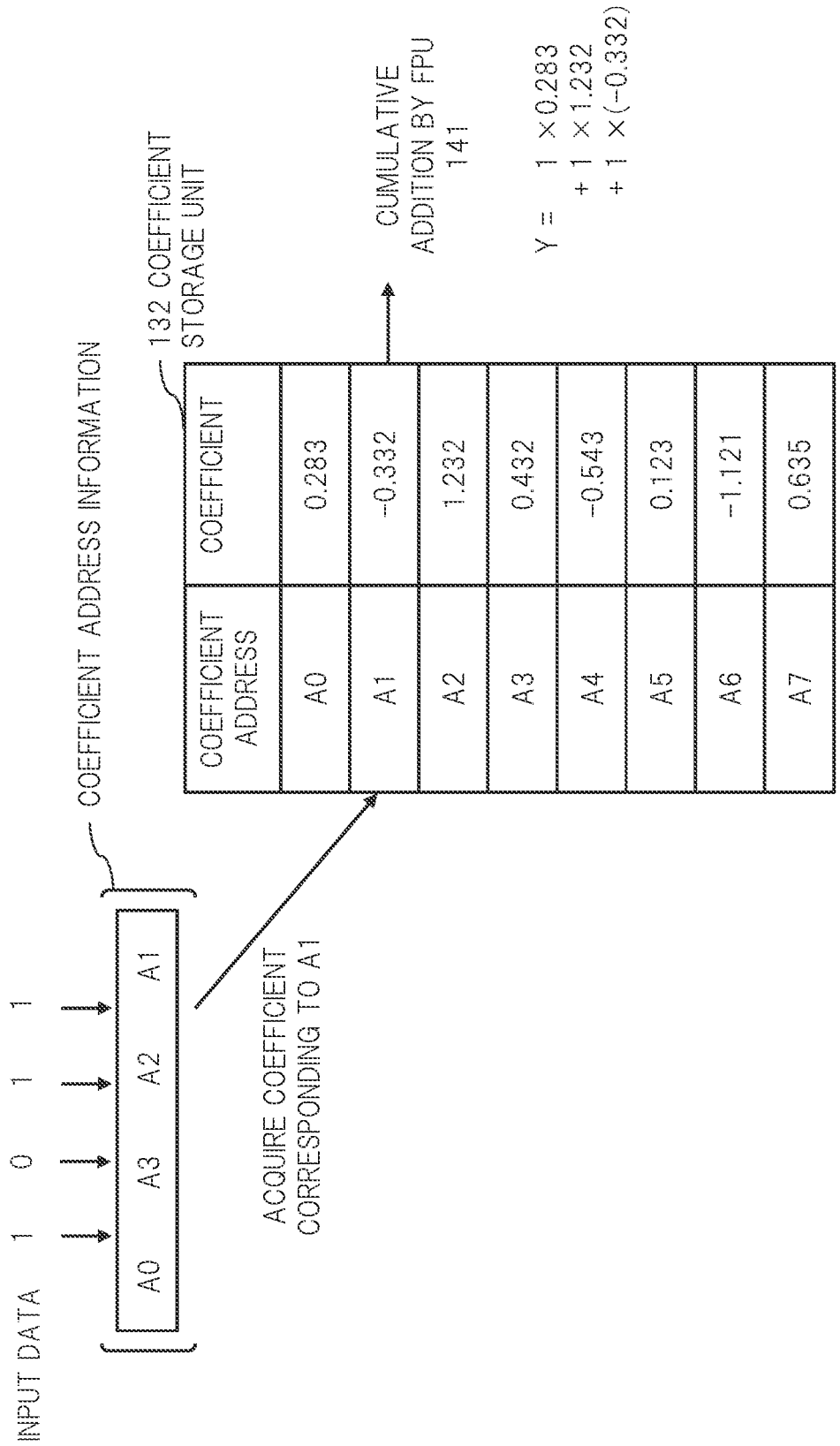
FIG. 8 is a diagram showing an example of a multiple accumulation for a fourth input data by the data processing device according to the first embodiment.

Finally, as shown in FIG. 8, the control unit 142 reads the 1 which is the binarized input data on fourth from left of (1 0 1 1) from the input data storage unit 130. The input data determining unit 140 determines that the binarized input data read from the input data storage unit 130 is 1 which is the predetermined value. The control unit 142 reads the coefficient address A1 from the coefficient address information storage unit 131 based on the determination result of the input data determining unit 140. Then, the control unit 142 reads the coefficient −0.332 corresponding to the address A1 from the coefficient storage unit 132 based on the coefficient address A1. The coefficient −0.332 read from the coefficient storage unit 132 by the control unit 142 is input to the FPU 141 by the control unit 142 and cumulatively added by the FPU 141.

By the cumulative addition by the FPU 141 shown in FIGS. 5 to 8, the multiple accumulation of the floating-point input data and the floating-point weight parameter is substituted.

FIGS. 5 to 8 show the state of the multiple accumulation related to the four binarized input data (1 0 1 1). In the inference processing of the neural network, the data processing device 1 sequentially reads a required number of binarized input data from the input data storage unit 130, and repeats the multiple accumulation described above.

FIG. 9 is a diagram showing an example of the multiple accumulation processing performed by the data processing device 1 according to the first embodiment. With reference to FIG. 9, the coefficients and the coefficient address information are values obtained by learning of the neural network, and are fixed values in the inference processing by the data processing device 1. The input data is, for example, input data such as an image. When the input data determining unit 140 determines that the input data is not 1 which is the predetermined value, the coefficient address information is not acquired, and thus, the multiplication result of (input data)×(coefficient) in the case where the input data is 0 is represented as 0. The cumulative addition value represents the progress and the result of the multiple accumulation by the FPU 141. In the multiple accumulation shown in FIG. 9, 0.468116 is obtained as the final multiple accumulation result.

Figure 10:
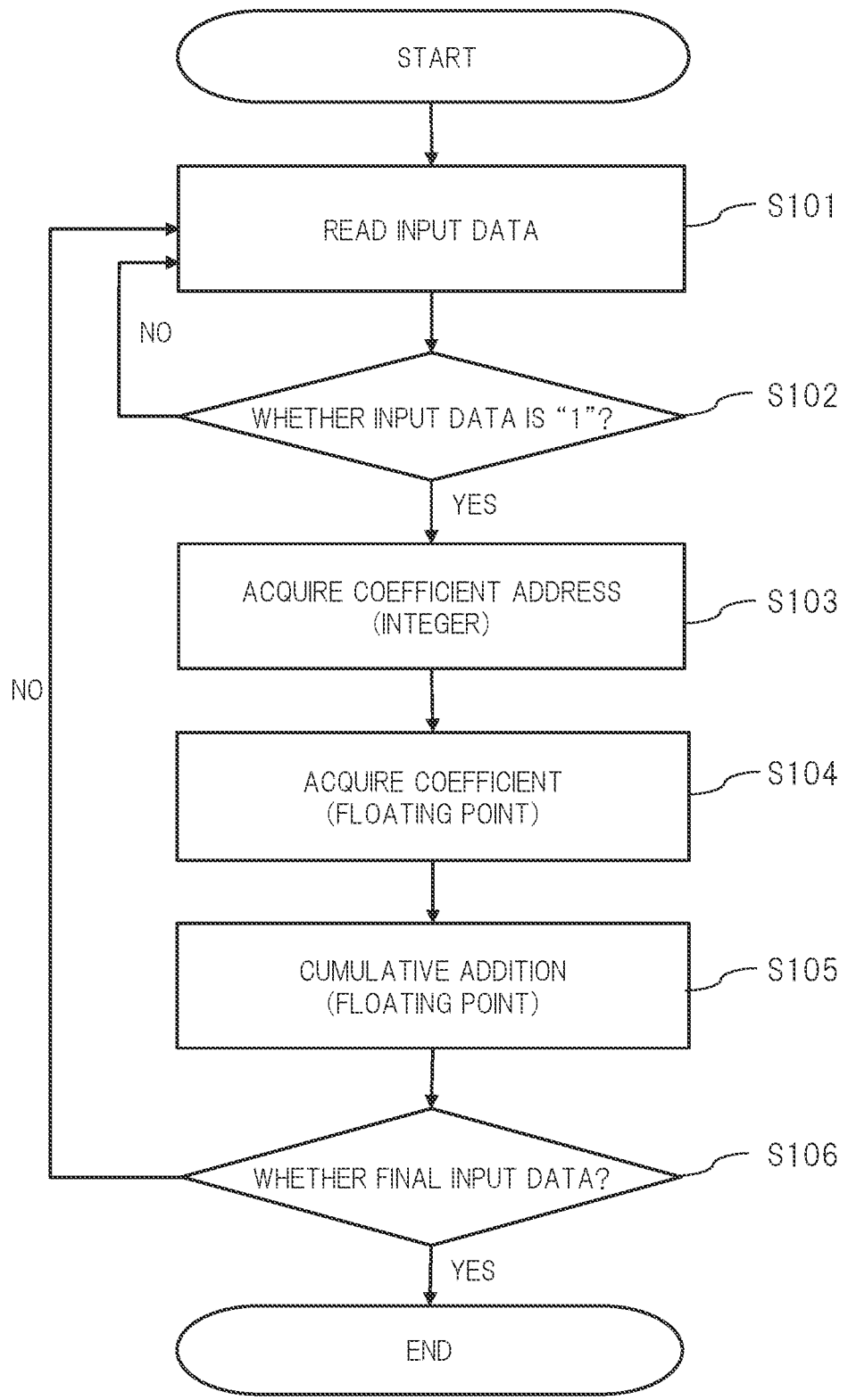
FIG. 10 is a flowchart showing an example of a multiple accumulation processing performed by the data processing device according to the first embodiment.

FIG. 10 is a flowchart showing an example of a multiple accumulation processing performed by the data processing device 1 according to the first embodiment. When the multiple accumulation is started, the control unit 142 reads the binarized input data from the input data storage unit 130 and transmits the binarized input data to the input data determining unit 140 (step S101).

When receiving the binarized input data, the input data determining unit 140 determines whether or not the binarized input data is a predetermined value (for example, 1) (step S102). When the input data determining unit 140 determines that the binarized input data is 0 (step S102: NO), the control unit 142 does not read the coefficient address from the coefficient address information storage unit 131. Then, the control unit 142 reads the next binarized input data from the input data storage unit 130 (step S101). On the other hand, when the input data determining unit 140 determines that the binarized input data is 1 (step S102: YES), the control unit 142 acquires the coefficient address from the coefficient address information storage unit 131 (step S103). Here, the coefficient address is the information related to the address where the coefficient is stored and is integer data.

Subsequently, the control unit 142 makes a read access to the coefficient storage unit 132 based on the coefficient address acquired from the coefficient address information storage unit 131, and acquires the coefficient (step S104). Here, the coefficient is floating-point data.

The coefficient acquired in step S104 is transmitted to the FPU 141 by the control unit 142. When the coefficient is input, the FPU 141 executes the cumulative addition of the floating-point data (step S105). By the cumulative addition of the coefficient by the FPU 141, the multiplication processing and the addition processing for the floating-point input data and the floating-point coefficient are substituted.

After executing the cumulative addition of the coefficient by the FPU 141, the control unit 142 determines whether or not the input data is the final input data (step S106). When the input data is the final input data (step S106: YES), the multiple accumulation processing is finished. On the other hand, when the input data is not the final input data (step S106: NO), the control unit 142 reads the next binarized input data from the input data storage unit 130, and transmits the next binarized input data to the input data determining unit 140 (step S101).

(Effect)

The data processing device 1 according to the first embodiment includes the coefficient address information storage unit 131, the coefficient storage unit 132, the input data determining unit 140, and the FPU 141. The data processing device 1 acquires the coefficient address from the coefficient address information storage unit 131 based on the determination result of the input data determining unit 140. Further, the data processing device 1 acquires the coefficient from the coefficient storage unit 132 based on the acquired coefficient address. Then, the data processing device 1 can substitute the multiple accumulation of the floating-point data by executing the cumulative addition of the acquired coefficients by the FPU 141. Since the data processing device 1 can refer to 2K coefficients based on K-bit coefficient addresses (K is a natural number), it is possible to realize the high recognition accuracy in the inference processing of the neural network while reducing the required memory capacity.

Also, in the data processing device 1 according to the first embodiment, the distribution of expressible coefficients becomes more diverse than that in the conventional technology. This point will be described with reference to FIGS. 28, 11, and 12.

Figure 11:
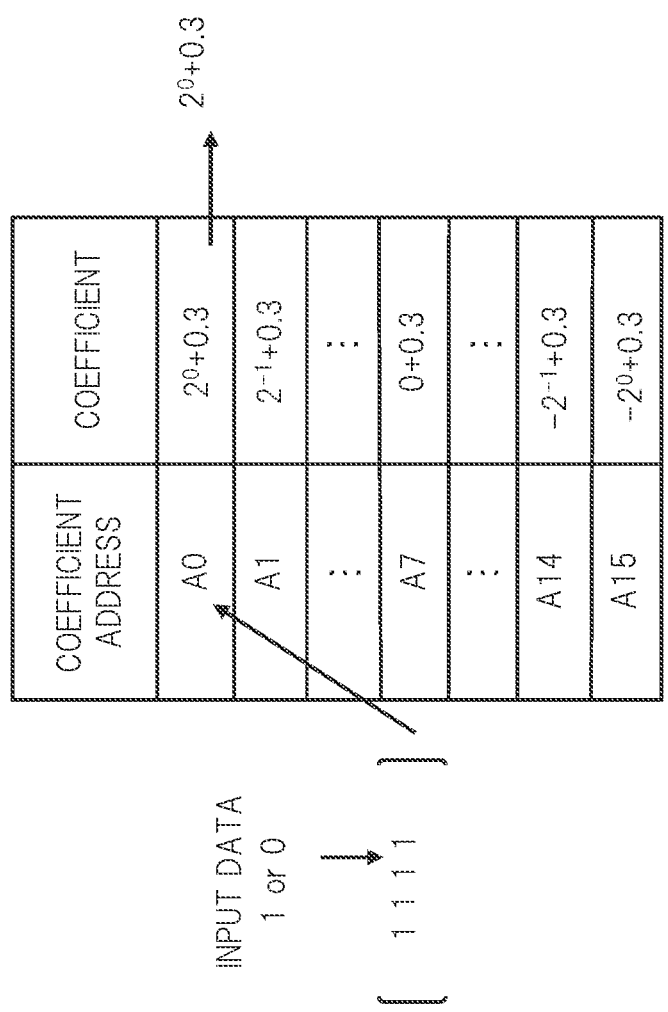
FIG. 11 is a diagram showing an example of coefficients stored in a coefficient storage unit according to the first embodiment.
Figure 28:
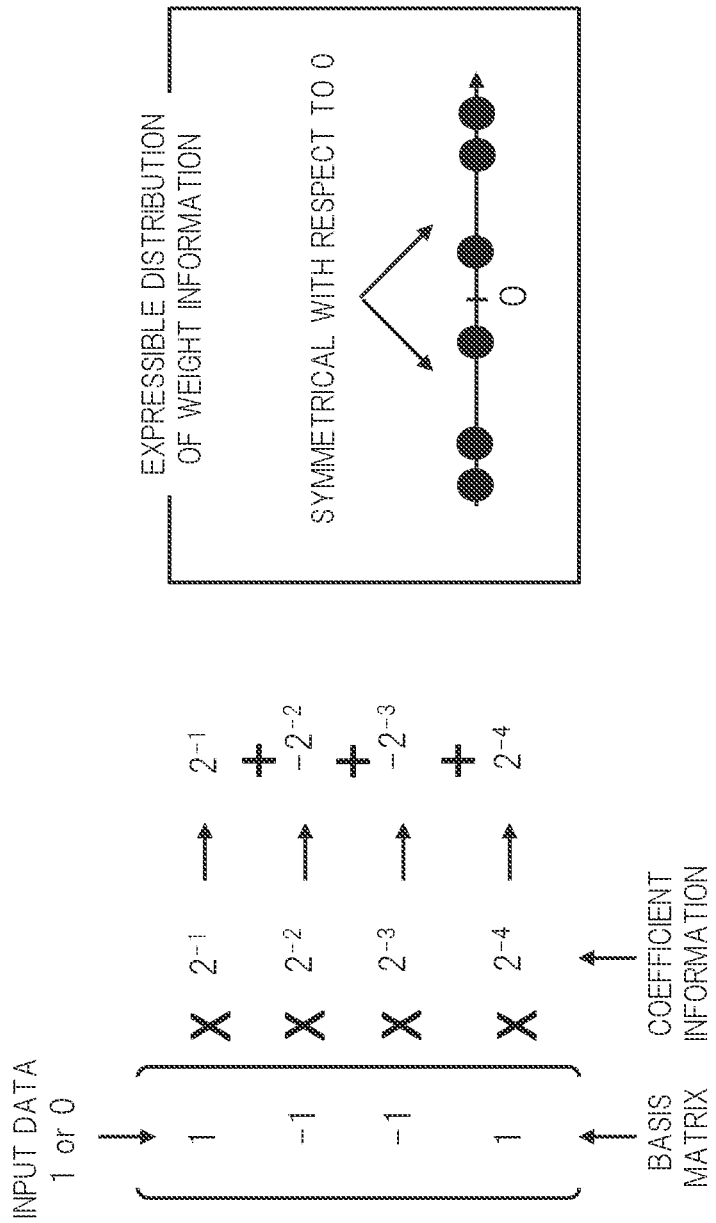
FIG. 28 is an explanatory diagram of a distribution of weight parameters in the case of the conventional technology.

FIG. 28 is a diagram showing a state of a distribution of weight parameters in the conventional technology. Also, FIG. 11 is a diagram showing an example of a distribution of coefficients that can be realized in the data processing device 1 according to the first embodiment. As shown in FIG. 28, according to the conventional technology, the weight parameter is decomposed into a basis matrix having binary components of 1 and −1 and coefficient information. Therefore, the realized distribution of the weight parameters is always symmetrical with respect to the origin (0). On the other hand, as shown in FIG. 11, in the data processing device 1 according to the first embodiment, the coefficients are referenced via coefficient addresses. As shown in FIG. 11, in the data processing device 1 according to the first embodiment, for example, +0.3 can be uniformly added to the coefficients. Therefore, in the data processing device 1 according to the first embodiment, the realized distribution of the weight parameters can be made asymmetrical with respect to the origin (0). In this manner, in the data processing device 1 according to the first embodiment, independent settings such as addition of individual bias values can be made for the coefficients stored in the coefficient storage unit 132.

Figure 12:
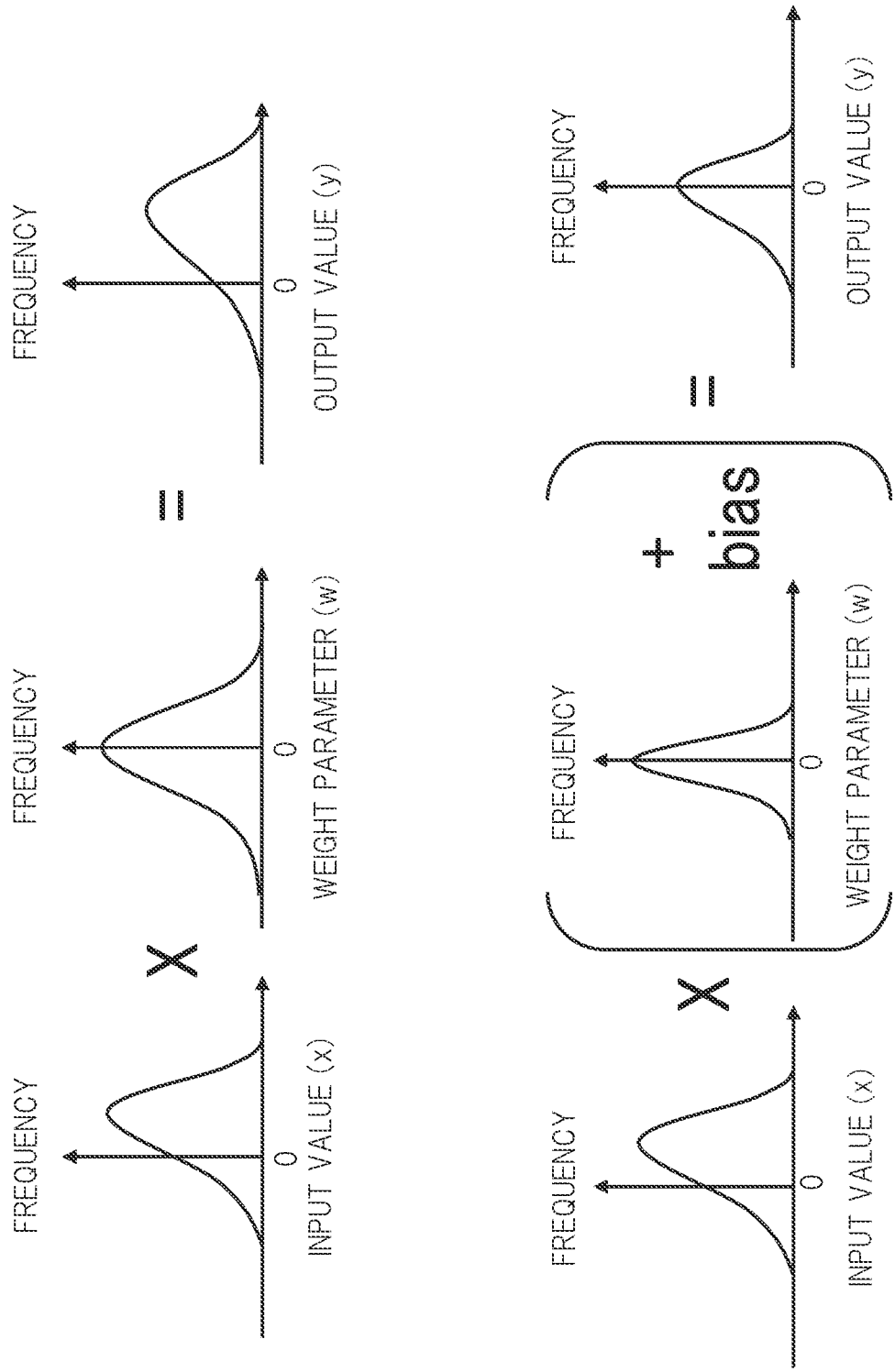
FIG. 12 is a diagram showing how the distribution of output data is improved by the data processing device according to the first embodiment.

FIG. 12 is a diagram for describing the relationship among the distribution of input values input to the neural network shown in FIG. 4, the distribution of weight parameters, and the distribution of output values. The upper side of FIG. 12 corresponds to the conventional technology, and the lower side of FIG. 12 corresponds to the first embodiment. As shown in the upper side of FIG. 12, when the input value of the distorted distribution is input, the output value is output as a more distorted distribution if the weight parameter is symmetrical between the plus (+) side and the minus (−) side. The reason why the distribution of the output value is more distorted is that it is necessary to execute the multiple accumulation many times in the neural network, and thus the distortion of the distribution increases each time the multiple accumulation is executed. As a result, the dispersion becomes large, which causes the deterioration of the accuracy of the inference processing.

On the other hand, as shown in the lower side of FIG. 12, when a weight parameter that is not symmetrical between the plus (+) side and the minus (−) side is expressed by adding a bias value to the weight parameter, the distortion of the output value distribution can be reduced. Since settings such as addition of the bias value to the coefficient are possible in the data processing device 1 according to the first embodiment, the Batch Normalization processing that corrects the dispersion and average value of output values can also be executed simultaneously with the multiple accumulation.

Also, when the input data determining unit 140 determines that the binarized input data is not a predetermined value (for example, 1), but is 0, the data processing device 1 does not acquire the coefficient address from the coefficient address information storage unit 131 and does not acquire the coefficient from the coefficient storage unit 132. Therefore, it is possible to reduce the unnecessary memory access and floating-point operation. In other words, the data processing device 1 can realize the speeding-up of the multiple accumulation and the reduction of power consumption required in the neural network.

Second Embodiment

Next, the second embodiment will be described. A data processing device 1A according to the second embodiment is different from the data processing device 1 according to the first embodiment in that the coefficient multiplied to each input data is expanded from 1 to M (M is a natural number of 2 or more) in order to improve the accuracy of the multiple accumulation. Since the coefficient multiplied to each input data is expanded from 1 to M (M is a natural number of 2 or more), the coefficient address to each input data is also expanded from 1 to M. Since the configuration and operation except that the number of coefficient addresses to one binarized input data is expanded from 1 to M are the same as those of the data processing device 1 described in the first embodiment, the same configurations are denoted by the same reference characters, and redundant description is omitted.

(Configuration)

Figure 13:
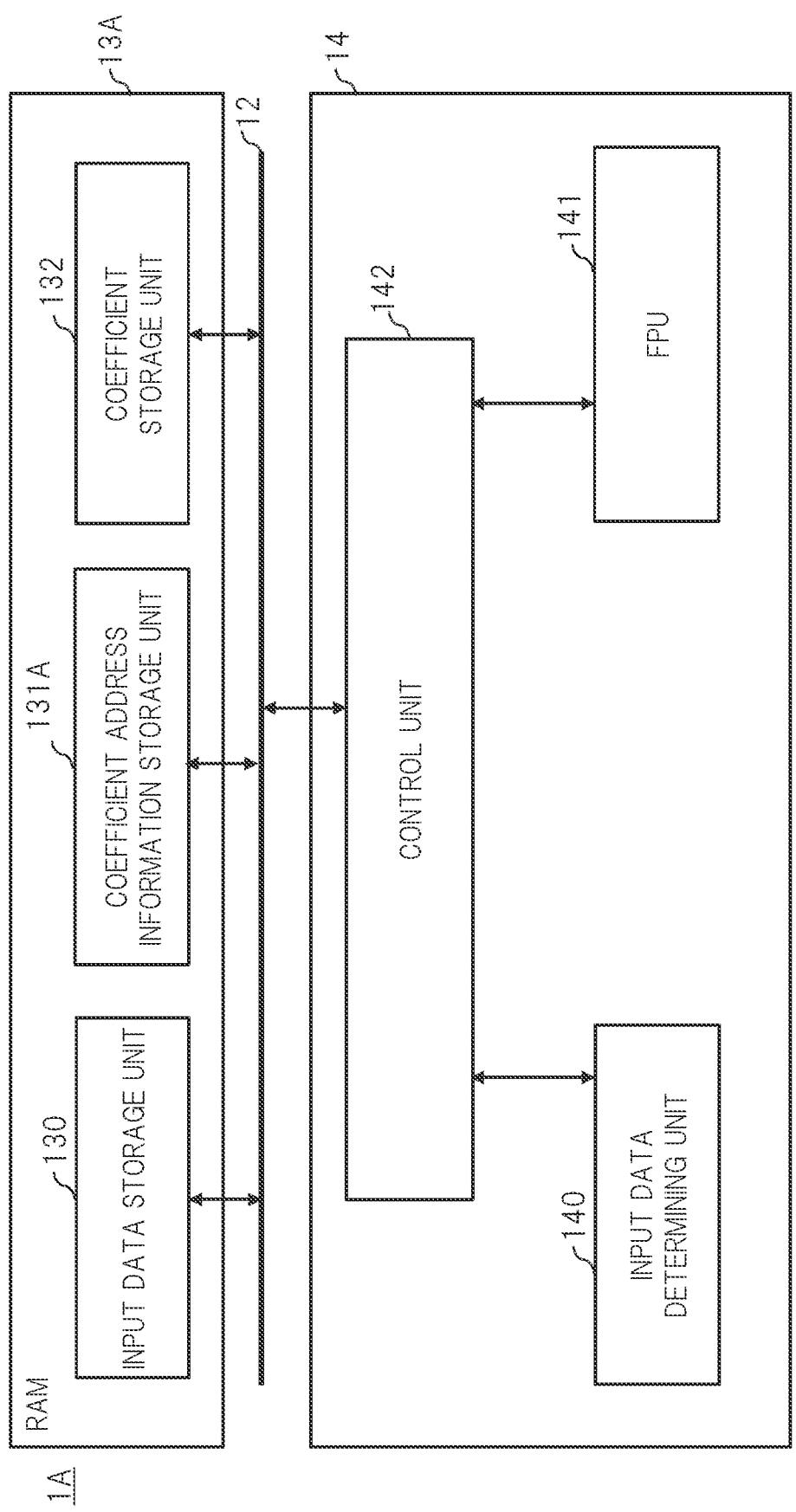
FIG. 13 is a circuit diagram showing a configuration example of an inference unit and a storage device of a data processing device according to the second embodiment.

FIG. 13 is a diagram showing a configuration example of the inference unit 14 and a RAM 13A according to the second embodiment. As shown in FIG. 13, the RAM 13A according to the second embodiment includes a coefficient address information storage unit 131A instead of the coefficient address information storage unit 131 according to the first embodiment.

Figure 14:
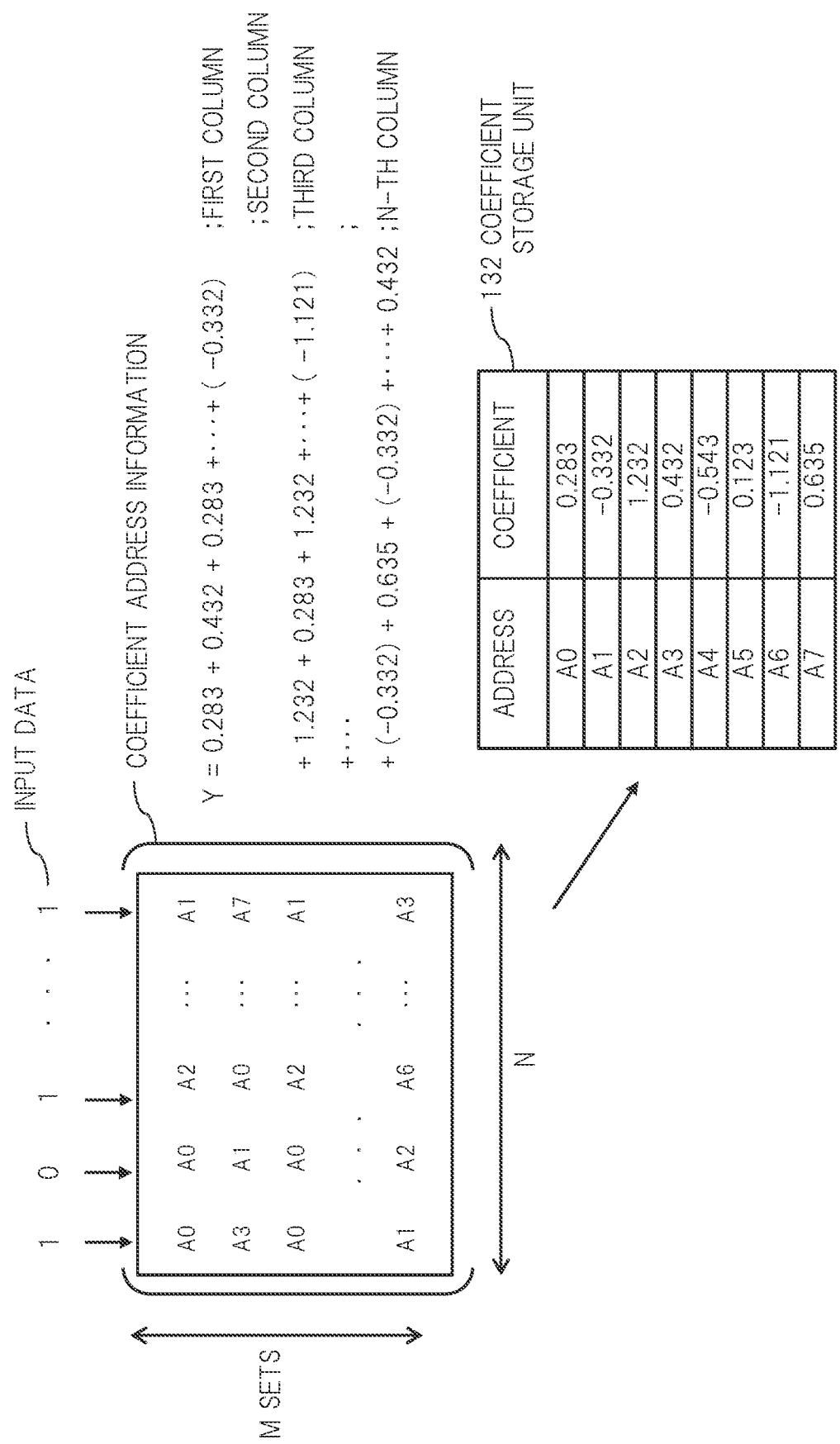
FIG. 14 is a diagram showing an outline of a multiple accumulation processing performed by the data processing device according to the second embodiment.

FIG. 14 is an explanatory diagram of an outline of a multiple accumulation processing performed by the data processing device according to the second embodiment. As shown in FIG. 14, in the data processing device 1A according to the second embodiment, the coefficient address information can be expressed as an M×N matrix. With reference to FIG. 14, the M coefficient addresses included in each column of the M×N matrix are determined in advance prior to the inference processing such that the sum of the M coefficients referenced by the M coefficient addresses is closest to the original weight parameter. With reference to the far left end (first column) of the matrix, (value of coefficient referenced by coefficient address A0)+(value of coefficient referenced by coefficient address A3)+(value of coefficient referenced by coefficient address A0)+ . . . +(value of coefficient referenced by coefficient address A1) is adjusted so as to be substantially equal to the first component (element) of the weight parameter before quantization. In other words, the coefficient address information is determined in correspondence with the fact that the weight parameter before quantization is decomposed so as to be substantially equal to the total sum value of one or a plurality of coefficients. As the method of adjusting the combination of coefficient addresses, for example, a table of weight parameter values that can be expressed from the combinations of M coefficient addresses is formed in advance, and the combination of M coefficient addresses by which the value of the table closet to the original weight parameter is generated can be stored in the coefficient address information storage unit 131A.

(Effect)

According to the second embodiment, the data processing device 1A stores a plurality of coefficient addresses for one binarized input data in the coefficient address information storage unit 131A. Thus, the weight parameter can be approximated more accurately than the data processing device 1A according to the first embodiment. Therefore, the data processing device 1A according to the second embodiment can realize the higher recognition accuracy in the inference processing of the neural network.

Third Embodiment (Configuration)

Figure 15:
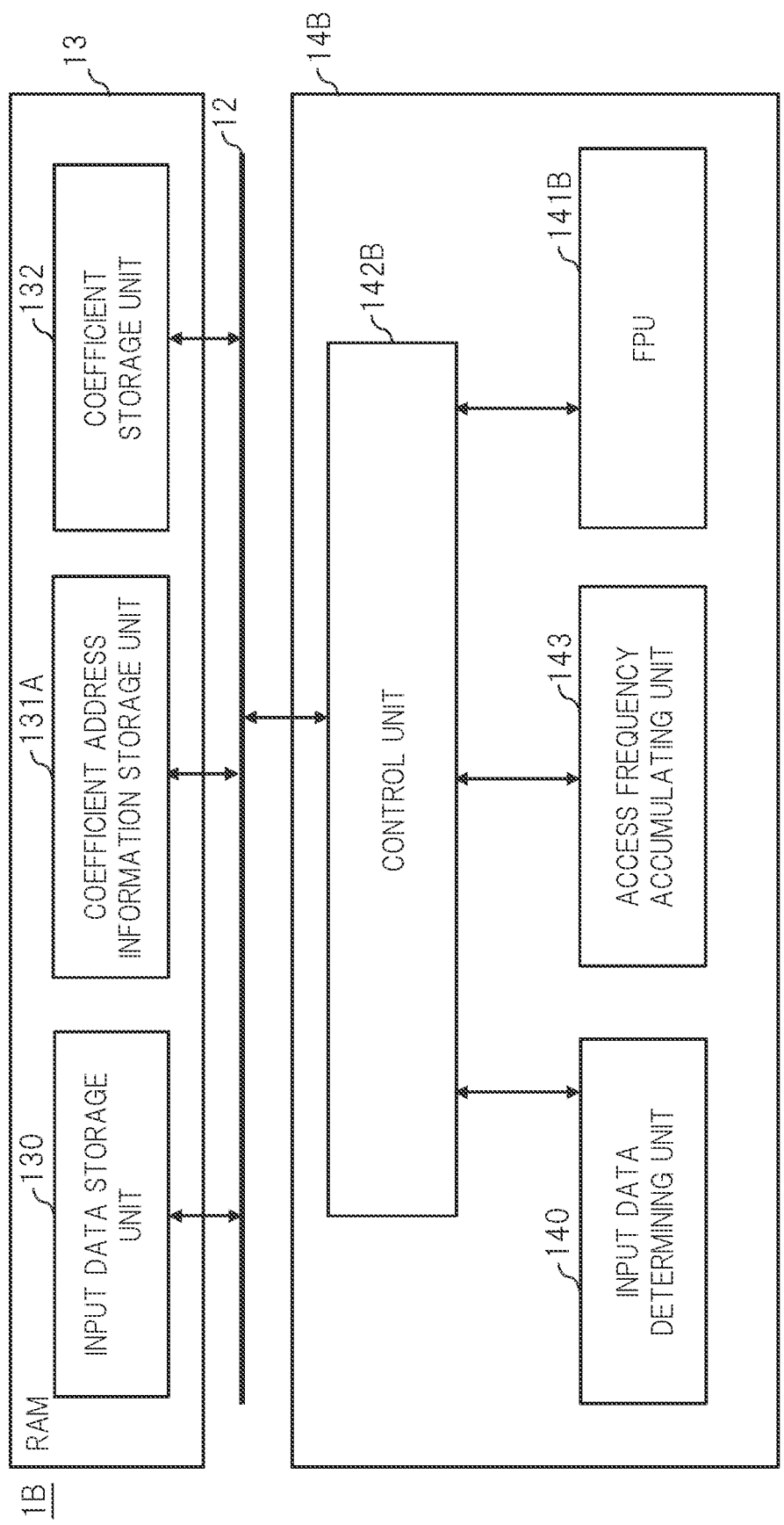
FIG. 15 is a circuit diagram showing a configuration example of an inference unit and a storage device of a data processing device according to the third embodiment.

FIG. 15 is a block diagram showing a configuration example of an inference unit 14B and the RAM 13 of a data processing device 1B according to the third embodiment. The data processing device 1B according to the third embodiment is different from the data processing device 1A according to the second embodiment in that the inference unit 14B further includes an access frequency accumulating unit 143 and a FPU 141B executes the multiple accumulation based on the number of accesses of the coefficient address accumulated in the access frequency accumulating unit 143. Since the configuration and operation other than those are the same as those of the data processing device 1 described in the first embodiment, the same configurations are denoted by the same reference characters, and redundant description is omitted.

With reference to FIG. 15, the access frequency accumulating unit 143 is a circuit that counts the reference frequency of each coefficient address for each of the plurality of coefficient addresses stored in the coefficient address information storage unit 131A. More specifically, the access frequency accumulating unit 143 counts the number of times the input data determining unit 140 determines to acquire each coefficient address during the process of calculating one output data. In other words, the access frequency accumulating unit 143 is a circuit that counts the reference frequency for each of the plurality of coefficient addresses.

(Operation)

Figure 16:
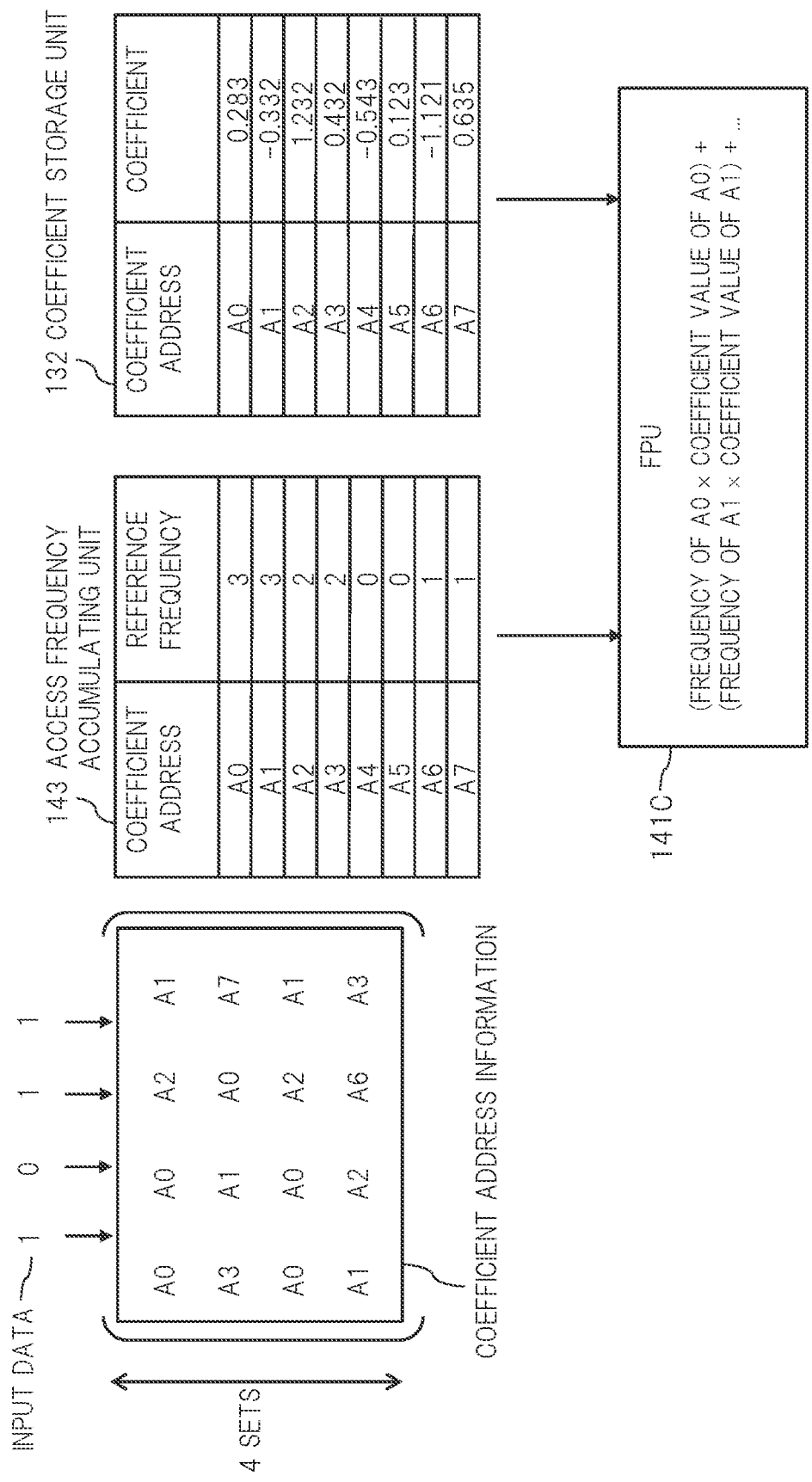
FIG. 16 is an explanatory diagram of a concept of a multiple accumulation processing performed by the data processing device according to the third embodiment.

FIG. 16 is a diagram showing an example of the operation of the access frequency accumulating unit 143 when obtaining one output data in the data processing device 1B according to the third embodiment. With reference to FIG. 16, for four binarized input data, a weight parameter is expressed by a coefficient address matrix having 4×4 coefficient addresses as components.

In FIG. 16, the first binarized input data is 1 shown on far left of (1 0 1 1). Therefore, the input data determining unit 140 determines to acquire the coefficient address from the coefficient address information storage unit 131A by a control unit 142B. The control unit 142B sequentially acquires the coefficient addresses A0, A3, A0, and A1 included in the first column of the 4×4 coefficient address matrix from the coefficient address information storage unit 131A based on the determination result of the input data determining unit 140. The control unit 142B sequentially transmits the acquired coefficient addresses A0, A3, A0, and A1 to the access frequency accumulating unit 143. The access frequency accumulating unit 143 counts 2 as the reference frequency of the coefficient address A0, 1 as the reference frequency of the coefficient address A1, and 1 as the reference frequency of the coefficient address A3, and stores the information thereof.

Subsequently, the second binarized input data is 0 on second from left of (1 0 1 1). Therefore, the control unit 142B performs the control not to access the coefficient address information storage unit 131A based on the determination result of the input data determining unit 140. Therefore, the count value stored in the access frequency accumulating unit 143 is not updated.

Next, the third binarized input data is 1 shown on third from left of (1 0 1 1). Therefore, the input data determining unit 140 determines to acquire the coefficient address from the coefficient address information storage unit 131A by the control unit 142B. The control unit 142B sequentially acquires the coefficient addresses A2, A0, A2, and A6 from the coefficient address information storage unit 131A based on the determination result of the input data determining unit 140. The control unit 142B sequentially transmits the acquired coefficient addresses A2, A0, A2, and A6 to the access frequency accumulating unit 143. The access frequency accumulating unit 143 counts 3 as the reference frequency of the coefficient address A0, 1 as the reference frequency of the coefficient address A1, 2 as the reference frequency of the coefficient address A2, 1 as the reference frequency of the coefficient address A3, and 1 as the reference frequency of the coefficient address A6, and stores the information thereof.

Finally, the fourth binarized input data is 1 shown on fourth from left of (1 0 1 1). Therefore, the input data determining unit 140 determines to acquire the coefficient address from the coefficient address information storage unit 131A by the control unit 142B.

As shown in FIG. 16, finally, the access frequency accumulating unit 143 stores the count result information of 3 as the reference frequency of the coefficient address A0, 3 as the reference frequency of the coefficient address A1, 2 as the reference frequency of the coefficient address A2, 2 as the reference frequency of the coefficient address A3, 0 as the reference frequency of the coefficient address A4, 0 as the reference frequency of the coefficient address A5, 1 as the reference frequency of the coefficient address A6, and 1 as the reference frequency of the coefficient address A7.

The FPU 141B according to the third embodiment executes the multiple accumulation for calculating the output data with respect to the input data (1 0 1 1) based on the accumulation result of the access frequency accumulating unit 143 and the coefficients stored in the coefficient storage unit 132. Specifically, the output data is obtained by calculating (reference frequency of coefficient address A0)×(coefficient stored in coefficient address A0)+(reference frequency of coefficient address A1)×(coefficient stored in coefficient address A1)+(reference frequency of coefficient address A2)×(coefficient stored in coefficient address A2)+ (reference frequency of coefficient address A3)×(coefficient stored in coefficient address A3)+(reference frequency of coefficient address A4)×(coefficient stored in coefficient address A4)+(reference frequency of coefficient address A5)×(coefficient stored in coefficient address A5)+(reference frequency of coefficient address A6)×(coefficient stored in coefficient address A6)+(reference frequency of coefficient address A7)×(coefficient stored in coefficient address A7). In the example of FIG. 15, the output data is calculated by executing the operation of 3×0.283+3×(−0.332)+2× 1.232+2×0.432+0×(−0.543)+0×0.123+1×(−1.121)+1×0.635 by the FPU 141B.

Figure 17:
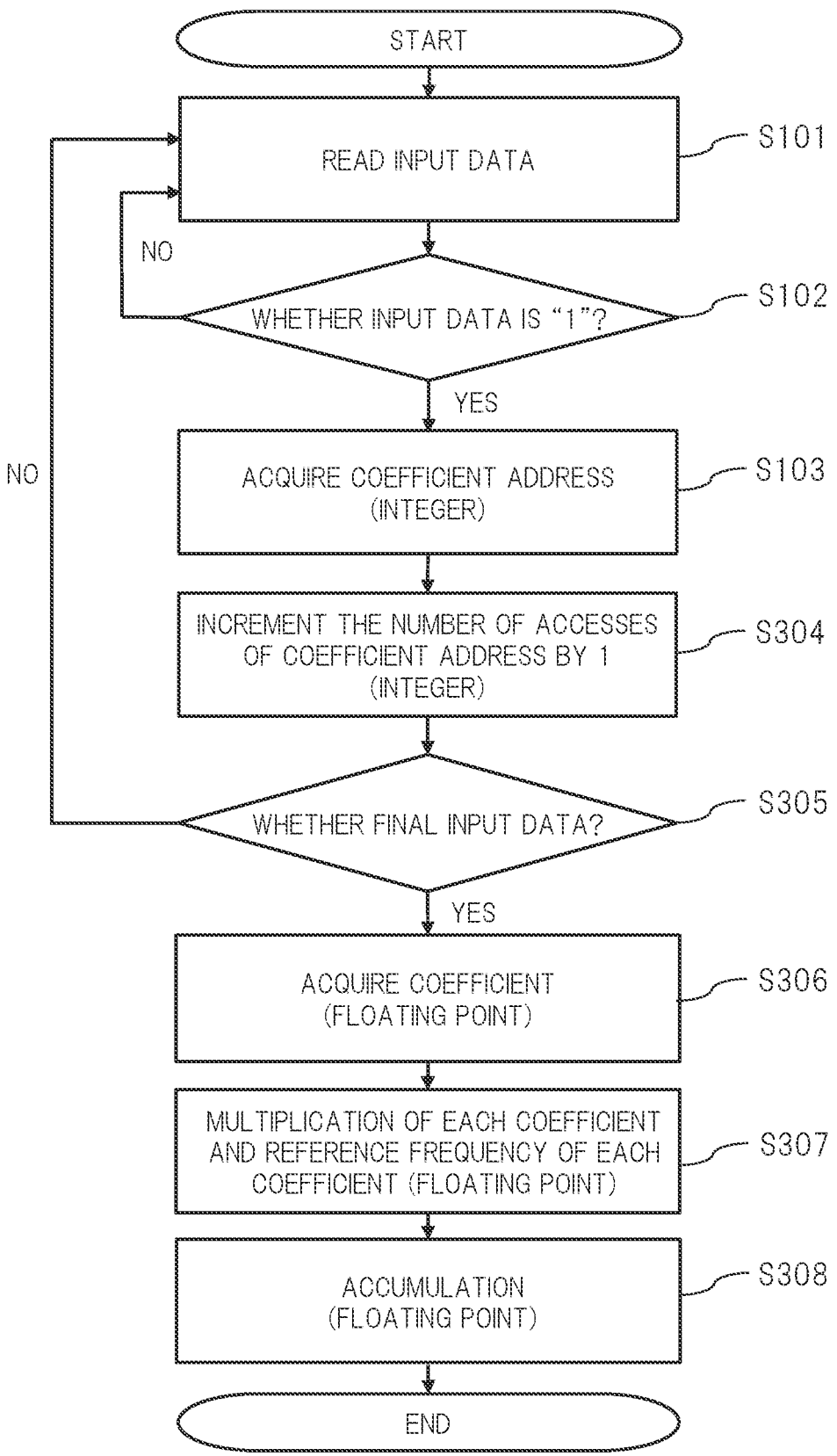
FIG. 17 is a flowchart showing an example of the multiple accumulation processing performed by the data processing device according to the third embodiment.

FIG. 17 is a flowchart showing an example of the multiple accumulation processing by the data processing device 1B according to the third embodiment. When the multiple accumulation is started, the control unit 142B reads the binarized input data from the input data storage unit 130. The control unit 142B transmits the acquired binarized input data to the input data determining unit 140 (step S101).

When the input data determining unit receives the binarized input data, the input data determining unit 140 determines whether or not the binarized input data is 1 which is the predetermined value (step S102). When the input data determining unit 140 determines that the binarized input data is 0 (step S102: NO), the control unit 142B does not read the coefficient address from the coefficient address information storage unit 131A. Then, the control unit 142B reads the next binarized input data from the input data storage unit 130 (step S101). On the other hand, when the input data determining unit 140 determines that the binarized input data is 1 (step S102: YES), the control unit 142B acquires the coefficient address from the coefficient address information storage unit 131A (step S103). Here, the coefficient address is the address value where the coefficient is stored and is integer data.

The control unit 142B transmits the coefficient address acquired from the coefficient address information storage unit 131A to the address frequency accumulating unit 143. The access frequency accumulating unit 143 increments the count value related to the coefficient address by 1 based on the received coefficient address (step S304). The counting operation of the access frequency accumulating unit 143 is an integer arithmetic processing.

Following step S304, the control unit 142B determines whether or not the binarized input data is the final input data (step S305). When the input data is the final input data (step S305: YES), the control unit 142B acquires the coefficient whose count value is 1 or more in the access frequency accumulating unit 143, from the coefficient storage unit 132 (step S306). On the other hand, when the binarized input data is not the final input data (step S305: NO), the control unit 142B reads the next binarized input data from the input data storage unit 130 (step S101).

The coefficient acquired from the coefficient storage unit 132 in step S306 is transmitted to the FPU 141B. Following step S306, the FPU 141B calculates the multiply of the reference frequency of each coefficient counted by the access frequency accumulating unit 143 and each coefficient (step S307). Further, the FPU 141B calculates the total sum of the multiplies calculated in step S307 (step S308). When the FPU 141B completes the accumulation in step S308, the multiple accumulation is finished.

(Effect)

The data processing device 1B according to the third embodiment further includes the access frequency accumulating unit 143 as compared with the data processing device 1A according to the second embodiment. The access frequency accumulating unit 143 counts the number of times the read access is made to the coefficient address read from the coefficient address information storage unit 131A. In other words, since the access frequency accumulating unit 143 counts the number of times each coefficient stored in the coefficient storage unit 132 is used for the multiple accumulation, it is possible to know the number of cumulative additions of each coefficient in the FPU 141B. Therefore, in the data processing device 1B, it is not necessary to access the coefficient storage unit 132 in order to read the coefficient corresponding to the coefficient address each time the coefficient address is acquired from the coefficient address information storage unit 131A. Namely, in the data processing device 1B, for the multiple accumulation in the FPU 141B, it is just required to access the coefficient storage unit 132 only once for each coefficient. Since the power required for memory access is normally larger than the power required for counting the reference frequency, the data processing device 1B according to the third embodiment can suppress the power required for inference processing by the neural network. In the neural network, the number of weight parameters used in the multiple accumulation processing is large, and thus the data processing device 1B according to the third embodiment has a great power suppression effect.

(Modification)

The example in which the access frequency accumulating unit 143 is further provided to the configuration of the second embodiment has been described in the third embodiment, but the application of the access frequency accumulating unit 143 is not limited to the second embodiment. Namely, by further providing the access frequency accumulating unit 143 to the inference unit 14 of the first embodiment, the effect similar to that of the third embodiment can be achieved even in the case of using the 1×N coefficient address matrix.

Fourth Embodiment

It is assumed in the first to third embodiments that the binarized input data is 0 or 1. Based on this assumption, the input data determining unit 140 determines whether or not the coefficient address is acquired from the coefficient address information storage unit 131 in the data processing device 1 and the data processing device 1A. In the neural network, a ramp function called ReLU (Rectified Linear Unit) is mainly integrated as an activation function with respect to each output data, and the result is used as input to the next stage in many cases. Here, the ReLU is a function that outputs the value of an input value when the input value is 0 or more and outputs 0 when the input value is less than 0. Therefore, since the input data is 0 or a positive value, it is assumed in the first to third embodiments that the binarized input data is 0 or 1.

Incidentally, a function other than the ReLU is sometimes used as an activation function, and the input data may become a negative value in such a case. A data processing device 1C according to the fourth embodiment is suitable for the case where the input data is the data binarized so as to take two positive and negative values as described above.

(Configuration)

Figure 18:
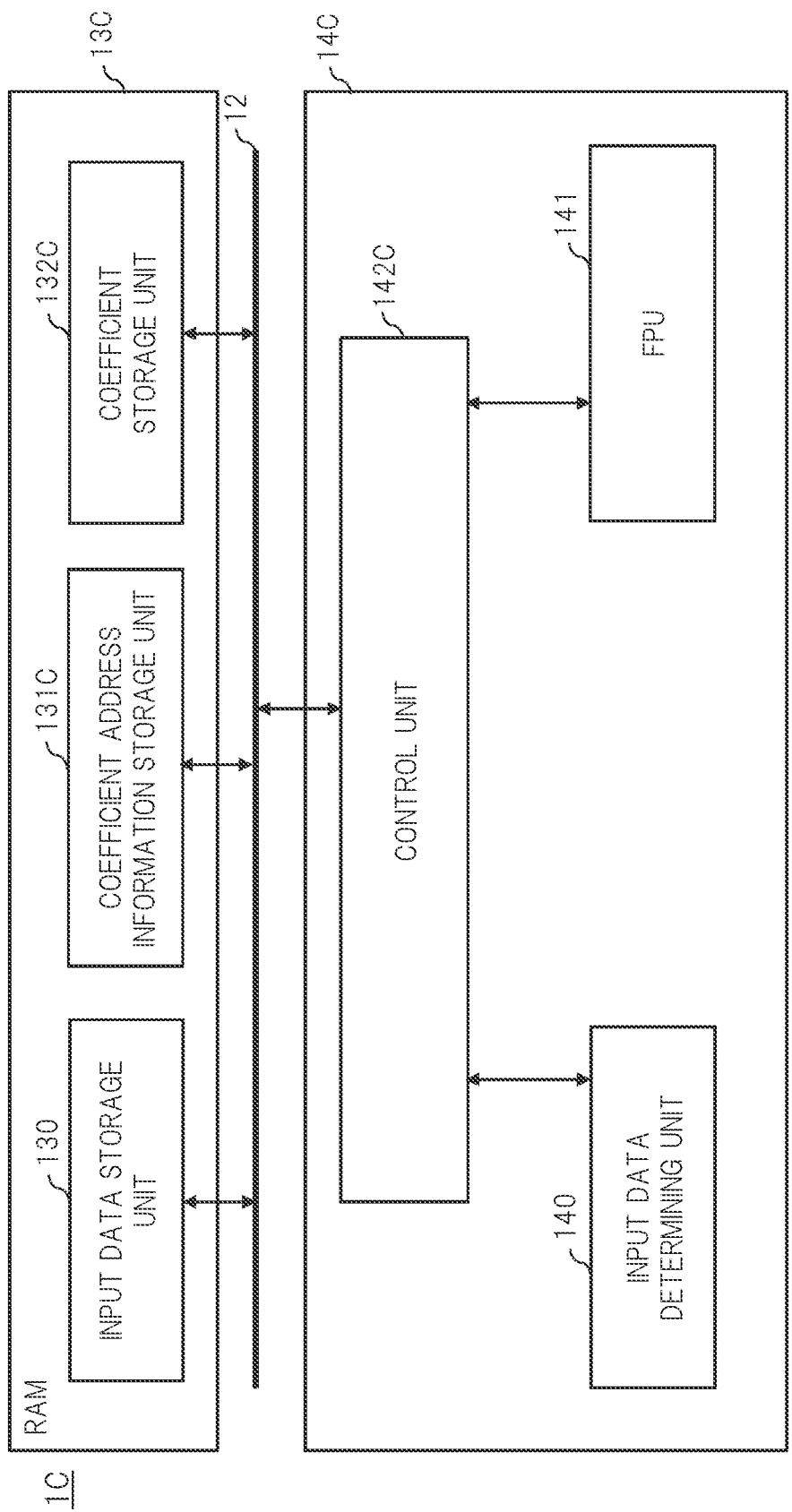
FIG. 18 is a circuit diagram showing a configuration example of an inference unit and a storage device of a data processing device according to the fourth embodiment.

FIG. 18 is a diagram showing a configuration example of an inference unit 14C and a RAM 13C according to the fourth embodiment. The inference unit 14C according to the fourth embodiment includes a control unit 142C instead of the control unit 142 according to the first embodiment. Further, the RAM 13C according to the fourth embodiment includes a coefficient address information storage unit 131C instead of the coefficient address information storage unit 131. The RAM 13C according to the fourth embodiment further includes a coefficient storage unit 132C instead of the coefficient storage unit 132.

Figure 19:
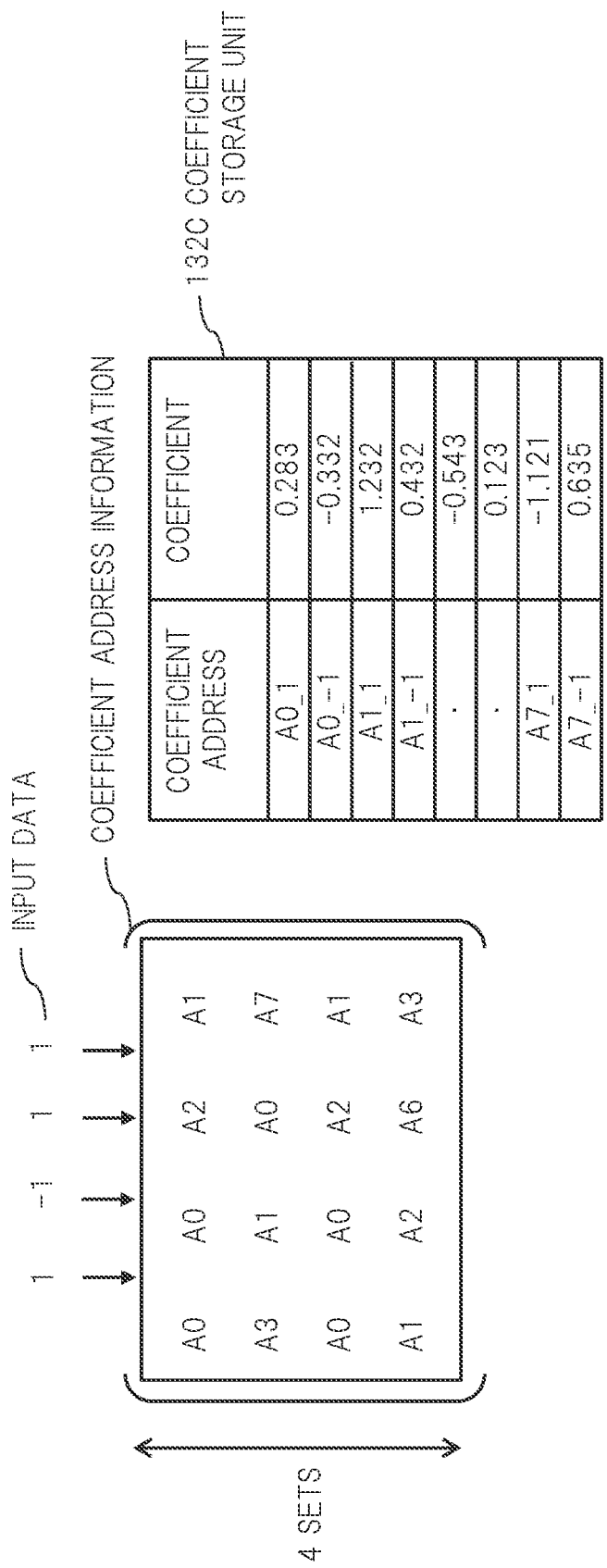
FIG. 19 is a diagram showing an example of coefficients stored in a coefficient storage unit according to the fourth embodiment.

FIG. 19 is a diagram showing a configuration example of the coefficient address information storage unit 131C and the coefficient storage unit 132C according to the fourth embodiment. The data processing device 1C according to the fourth embodiment is different from the first embodiment and the second embodiment in that coefficients for each of the case where the binarized input data is positive and the case where the binarized input data is negative are respectively storage in the coefficient storage unit 132C. Since the coefficient acquired by the control unit 142C differs depending on the case where the binarized input data is positive and the case where the binarized input data is negative, the coefficient address information storage unit 131C also stores different coefficient addresses depending on the case where the input data is positive and the case where the input data is negative. Since the configuration and operation other than these are the same as those of the data processing devices 1 and 1A described in the first and second embodiments, the same configurations are denoted by the same reference characters, and redundant description is omitted.

As shown in FIG. 19, the binarized input data may take two positive and negative values of 1 and −1. When the input data is 1, the control unit 142C acquires a coefficient address An_1 instead of a coefficient address An (n is an integer of 0 or more and 7 or less). On the other hand, when the input data is −1, the control unit 142C acquires a coefficient address An_−1 instead of the coefficient address An (n is an integer of 0 or more and 7 or less).

(Operation)

In the example of FIG. 19, (1 −1 1 1) are sequentially read as the binarized input data from the input data storage unit 130. The first binarized input data is 1 on far left of (1 −1 1 1). Since the first binarized input data is a positive value, the control unit 142C acquires four coefficient addresses of A0_1, A3_1, A0_1, and A1_1 so as to correspond to the first column of the 4×4 coefficient address matrix. For example, the control unit 142C acquires the coefficient 0.283 based on the acquired coefficient address A0_1.

On the other hand, the second binarized input data is −1 on second from left of (1 −1 1 1). Since the second binarized input data is a negative value, the control unit 142C acquires four coefficient addresses of A0_−1, A1_−1, A0_−1, and A2_−1 so as to correspond to the second column of the 4×4 coefficient address matrix. For example, the control unit 142C acquires the coefficient −0.332 based on the acquired coefficient address A0_−1.

(Effect)

Figure 20:
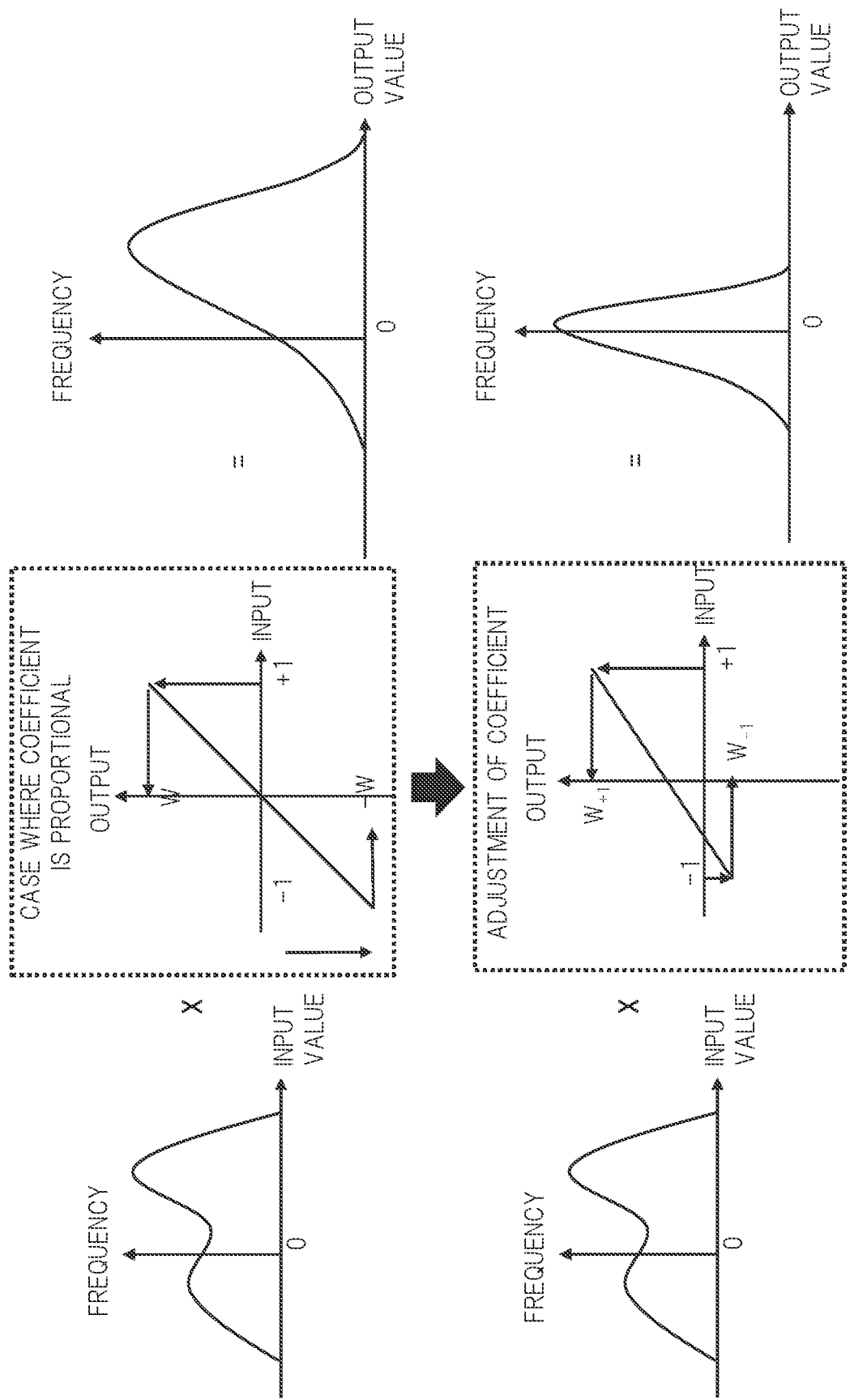
FIG. 20 is a diagram showing how the distribution of output data is improved by the data processing device according to the fourth embodiment.

FIG. 20 shows an example of a state of a distribution of an output value in the case where an input value of a distorted distribution is input to a neural network. As described above, a function other than the ReLU is sometimes used as an activation function, and the input data may become a negative value in such a case. In such a case, if the proportional relationship between the input data and the output data is acceptable, the method of changing only the positive and negative signs of the referenced coefficient in accordance with the sign of the input data is also applicable. However, when the distribution of the input value is distorted and the weight parameter is in the proportional relationship with the input value as shown in the upper drawing of FIG. 20, the spread of the distribution of the output value becomes large and the inference accuracy by the neural network is deteriorated.

On the other hand, by performing the processing (Batch Normalization) of adjusting the weight parameter and the bias value such that the average becomes 1 and the dispersion becomes 1 as shown in the lower drawing of FIG. 20, the distortion in the distribution of the input value can be suppressed in the distribution of the output value.

The coefficient address information storage unit 131C and the coefficient storage unit 132C according to the fourth embodiment respectively store the coefficient address information and the coefficients in accordance with the positive and negative signs of the binarized input data. Therefore, in the data processing device 1C according to the fourth embodiment, cumulative addition of different coefficients can be performed in accordance with the positive and negative signs of the binarized input data. In other words, the data processing device 1C can perform the Batch Normalization and the cumulative addition at the same time. As a result, the data processing device 1C can suppress the deterioration of inference accuracy by the neural network.

Fifth Embodiment (Configuration)

Figure 21:
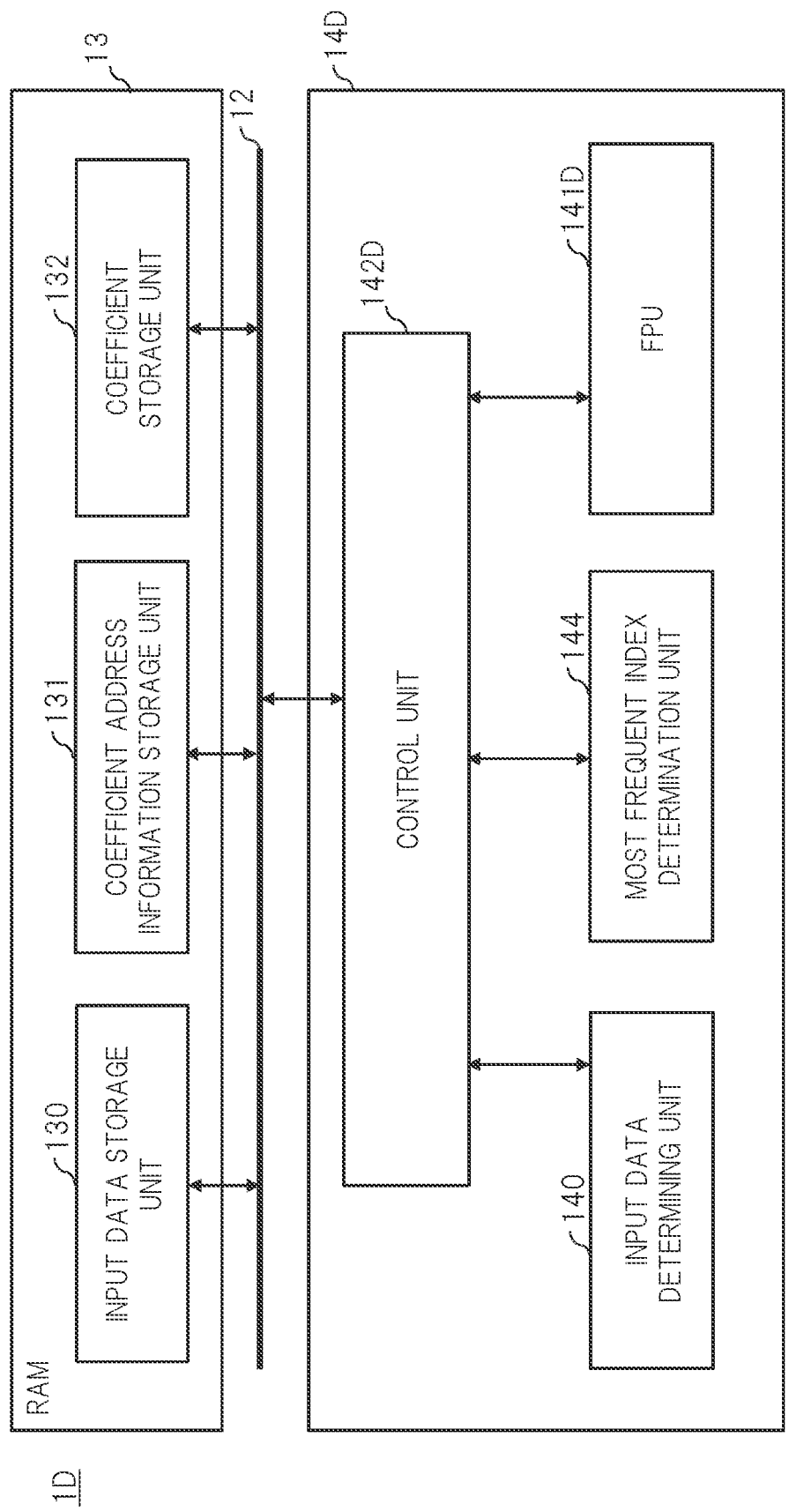
FIG. 21 is a circuit diagram showing a configuration example of an inference unit and a storage device of a data processing device according to the fifth embodiment.

FIG. 21 is a block diagram showing a configuration example of a data processing device 1D according to the fifth embodiment. The data processing device 1D according to the fifth embodiment is different from the data processing device 1 according to the first embodiment in that a most frequent index determination unit 144 is further provided, a coefficient adjusted by a control unit 142D is output to a FPU 141D, and the control unit 142D controls the FPU 141D to perform the offset addition. Since the configuration and operation other than those are the same as those of the data processing device 1 described in the first embodiment, the same configurations are denoted by the same reference characters, and redundant description is omitted.

As shown in FIG. 21, an inference unit 14D according to the fifth embodiment includes the input data determining unit 140, the most frequent index determination unit 144, the FPU 141D, and the control unit 142D.

In the fifth embodiment, the coefficient address with the highest appearance frequency among the coefficient addresses included in the coefficient address information is referred to as "most frequent coefficient address". The most frequent index determination unit 144 stores the most frequent coefficient address in order to determine whether or not the coefficient address read by the control unit 142D is the most frequent coefficient address. The method of determining the most frequent coefficient address will be described later. When the control unit 142D reads the coefficient address from the coefficient address information storage unit 131 based on the determination result of the input data determining unit 140, the most frequent index determination unit 144 determines whether or not the read coefficient address is the most frequent coefficient address. Further, the most frequent index determination unit 144 counts the number of times the coefficient address with the highest appearance frequency is read, by a counter (not shown).

The control unit 142D is different from the control unit 142 according to the first embodiment in having a function of controlling the FPU 141D to perform the offset addition related to the coefficient address with the highest appearance frequency. The offset addition will be described later with reference to FIG. 22 and FIG. 23.

The FPU 141D is different from the FPU 141 according to the first embodiment in performing the cumulative addition based on the coefficient adjusted in advance prior to the inference processing and performing the above-mentioned offset addition.

(Operation)

FIG. 22 is an explanatory diagram of a method of adjusting coefficient according to the fifth embodiment. The adjustment of coefficient shown in FIG. 22 is performed prior to the inference processing. In other words, the adjustment of coefficient shown in FIG. 22 is performed prior to the multiple accumulation.

For the adjustment of coefficient, first, the most frequent coefficient address is determined. The control unit 142D reads the coefficient address information from the coefficient address information storage unit 131 prior to the multiple accumulation, and transmits the coefficient address information to the most frequent index determination unit 144. The most frequent index determination unit 144 counts the frequency of appearance of the coefficient addresses A0 to A7 as to the coefficient address information read from the coefficient address information storage unit 131 by a counter (not shown). In the example of FIG. 22, the coefficient address A3 is acquired 162 times, and it can be seen that the coefficient stored at the coefficient address A3 is used most in the multiple accumulation. Therefore, the most frequent index determination unit 144 determines that the most frequent coefficient address is the coefficient address A3. Note that, although the example in which the most frequent index determination unit 144 determines the most frequent coefficient address has been described here, the method of determining the most frequent coefficient address is not limited to this. For example, the most frequent coefficient address may be determined by a personal computer and program outside the data processing device 1D. In this case, for example, the processor 10 executes the program and writes the most frequent coefficient address to a register (not shown) having the most frequent coefficient address provided in the most frequent index determination unit 144.

After the most frequent coefficient address is determined, the control unit 142D acquires the stored coefficients based on the coefficient addresses A0 to A7 in order to adjust the coefficients. Then, based on the information received from the most frequent index determination unit 144 that the coefficient address A3 is the most frequent coefficient address, the control unit 142D adjusts the acquired coefficients. More specifically, the adjustment is performed such that the value of the coefficient used most frequently becomes 0. In the example of FIG. 22, the control unit 142D adjusts the coefficient −0.13 stored at the coefficient address A3 to 0.00. In accordance with this adjustment, the control unit 142D adjusts the coefficient −0.79 stored at the coefficient address A0 to −0.66 (−0.79+0.13=−0.66). Similarly, it adjusts the coefficient −0.46 stored at the coefficient address A1 to −0.33 (−0.46+0.13=−0.33). In the same manner, the control unit 142D makes the adjustment of +0.13 to each of the coefficients stored at the coefficient addresses A2 and A4 to A7.

Next, the offset value determined prior to the inference processing performed by the data processing device 1D according to the fifth embodiment will be described. As described above, the most frequent index determination unit 144 determines the most frequent coefficient address and further counts the number of appearances of the most frequent coefficient address included in the coefficient address information by a counter (not shown). The offset value is calculated as (offset value)=(the number of times the most frequent coefficient address is read)×(coefficient used most frequently), and is stored in the coefficient storage unit 132.

After the inference processing is started, the FPU 141D according to the fifth embodiment executes the cumulative addition for the multiple accumulation based on the adjusted coefficients that are adjusted prior to the inference processing and stored in the coefficient storage unit 132. Following the cumulative addition based on the adjusted coefficients, the FPU 141D adds the offset value read from the coefficient storage unit 132 to the cumulative addition result mentioned above.

Figure 23:
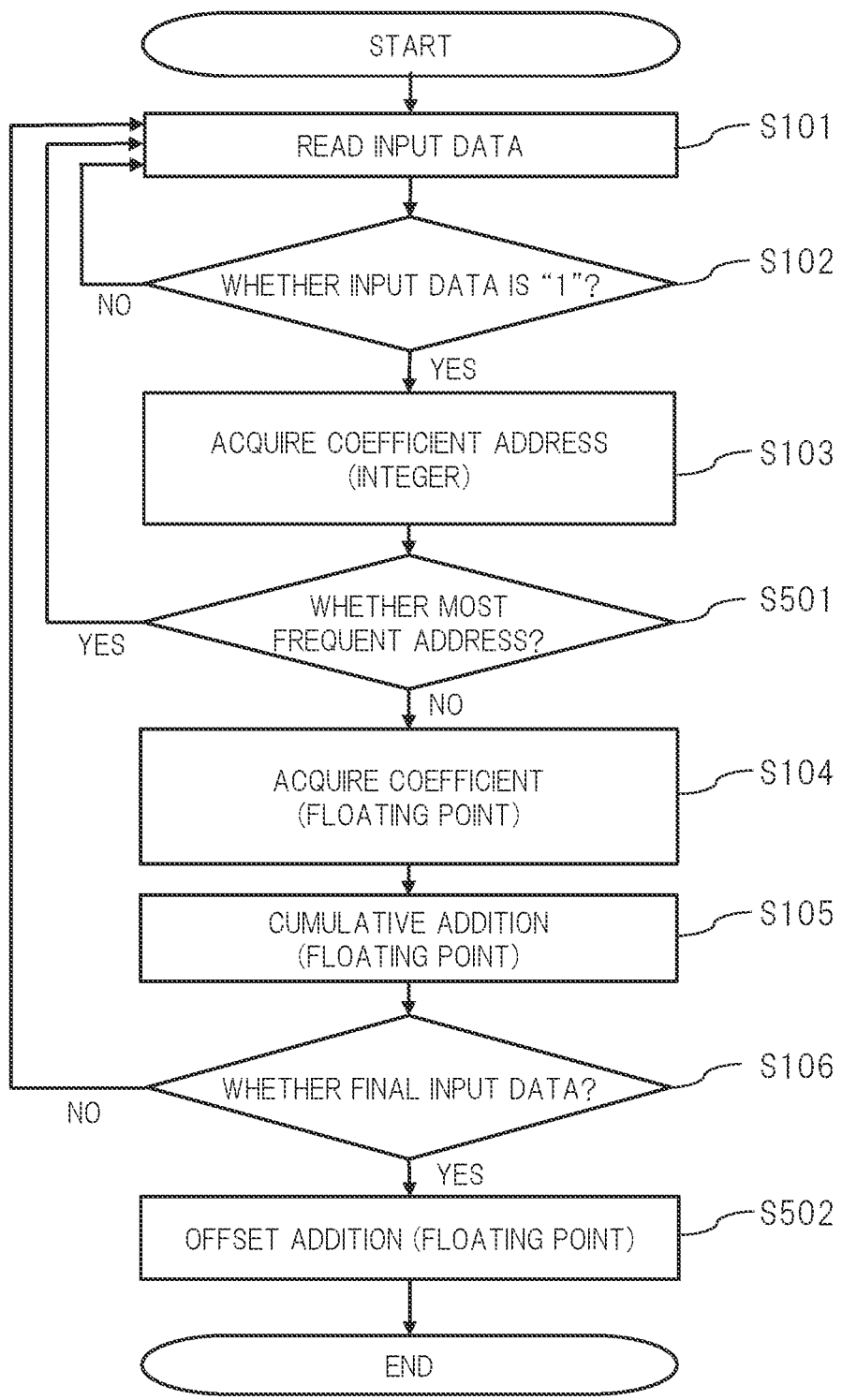
FIG. 23 is a flowchart showing an example of a multiple accumulation processing performed by the data processing device according to the fifth embodiment.

FIG. 23 is a flowchart showing an example of the multiple accumulation processing by the data processing device 1D according to the fifth embodiment. When the multiple accumulation is started, the control unit 142D reads the binarized input data from the input data storage unit 130. The control unit 142D transmits the acquired binarized input data to the input data determining unit 140 (step S101).

When the input data determining unit 140 receives the binarized input data, the input data determining unit 140 determines whether or not the binarized input data is a predetermined value (for example, 1) (step S102). When the input data determining unit 140 determines that the binarized input data is 0 (step S102: NO), the control unit 142D does not read the coefficient address from the coefficient address information storage unit 131. Then, the control unit 142D reads the next binarized input data from the input data storage unit 130 (step S101). On the other hand, when the input data determining unit 140 determines that the binarized input data is 1 (step S102: YES), the control unit 142D reads the coefficient address from the coefficient address information storage unit 131 (step S103).

The control unit 142D transmits the coefficient address acquired from the coefficient address information storage unit 131 to the most frequent index determination unit 144. The most frequent index determination unit 144 determines whether or not the received coefficient address is the most frequent coefficient address (step S501). When the received coefficient address is not the most frequent coefficient address (step S501: NO), the control unit 142D reads the coefficient from the coefficient storage unit 132 based on the determination result by the most frequent index determination unit 144 (step S104). On the other hand, when the received coefficient address is the most frequent coefficient address (step S501: YES), the control unit 142D does not read the coefficient from the coefficient storage unit 132 based on the determination result by the most frequent index determination unit 144, and performs the control to read the next input data (step S101).

The coefficient acquired in step S104 is transmitted to the FPU 141D by the control unit 142D. When the coefficient is input, the FPU 141D executes the cumulative addition of the floating-point data (step S105). By the cumulative addition of the coefficient by the FPU 141D, the multiplication processing and the addition processing for the floating-point input data and the floating-point coefficient are substituted.

After executing the cumulative addition of the coefficient by the FPU 141D, the control unit 142D determines whether or not the input data is the final input data (step S106). When the input data is not the final input data (step S106: NO), the control unit 142D reads the next binarized input data from the input data storage unit 130, and transmits the next binarized input data to the input data determining unit 140 (step S101). On the other hand, when the input data is the final input data (step S106: YES), the control unit 142D controls the FPU 141D to add the offset value to the cumulative addition result calculated in step S105 (step S502). When the offset addition by the FPU 141D is performed, one multiple accumulation is finished.
(Effect)

The data processing device 1D according to the fifth embodiment further includes the most frequent index determination unit 144 as compared with the data processing device 1 according to the first embodiment. At the time of the multiple accumulation, the most frequent index determination unit 144 determines whether or not the coefficient address read from the coefficient address information storage unit 131 is the most frequent coefficient address. Since the FPU 141D can omit the cumulative addition for the coefficient adjusted to 0, the power consumption and execution time required for the cumulative addition can be reduced.

Sixth Embodiment

In the first to fifth embodiments, the input data is binary such as 0 and 1 or 1 and −1. The sixth embodiment relates to a multiple accumulation processing when input data is composed of multiple bits.

Figure 24:
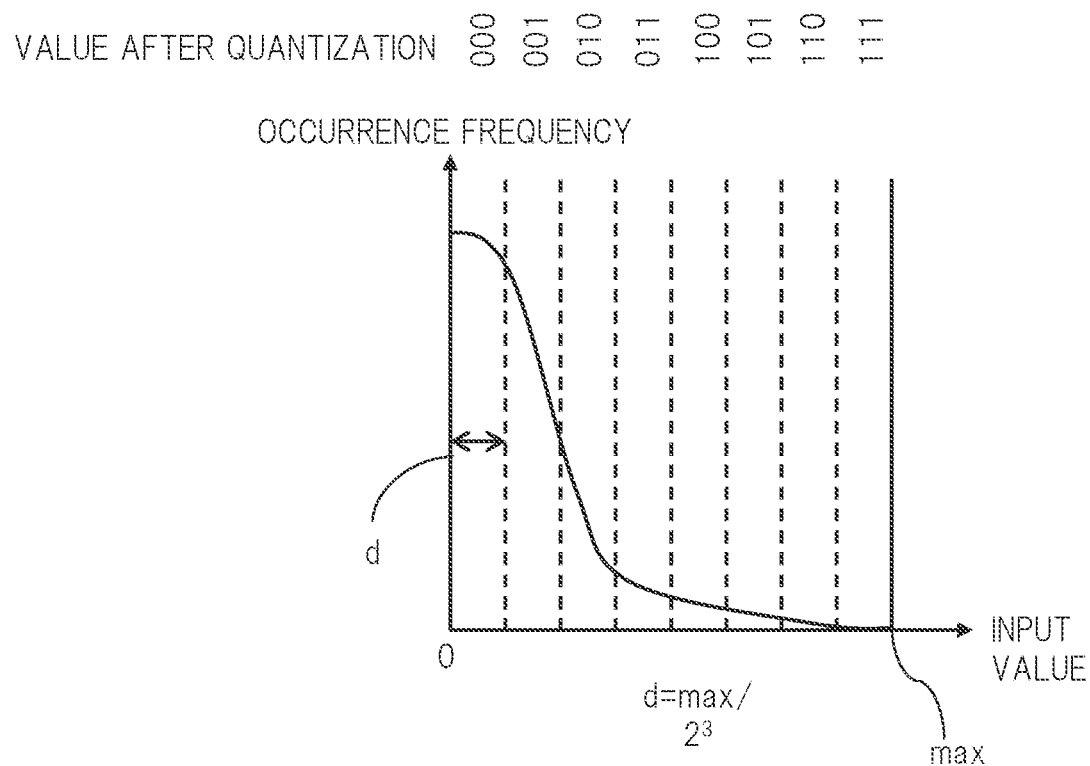
FIG. 24 is a diagram showing an example of a method of quantizing input data of a neural network to multiple bits according to the sixth embodiment.

FIG. 24 is a diagram showing an example of a method of quantizing input data to multiple bits. In FIG. 24, the input value is quantized to 000, 001, 010, 011, 100, 101, 110, or 111 depending on which sections obtained by dividing (maximum value of input value (max)−0) into equal eight parts it belongs to.
(Configuration)

Figure 25:
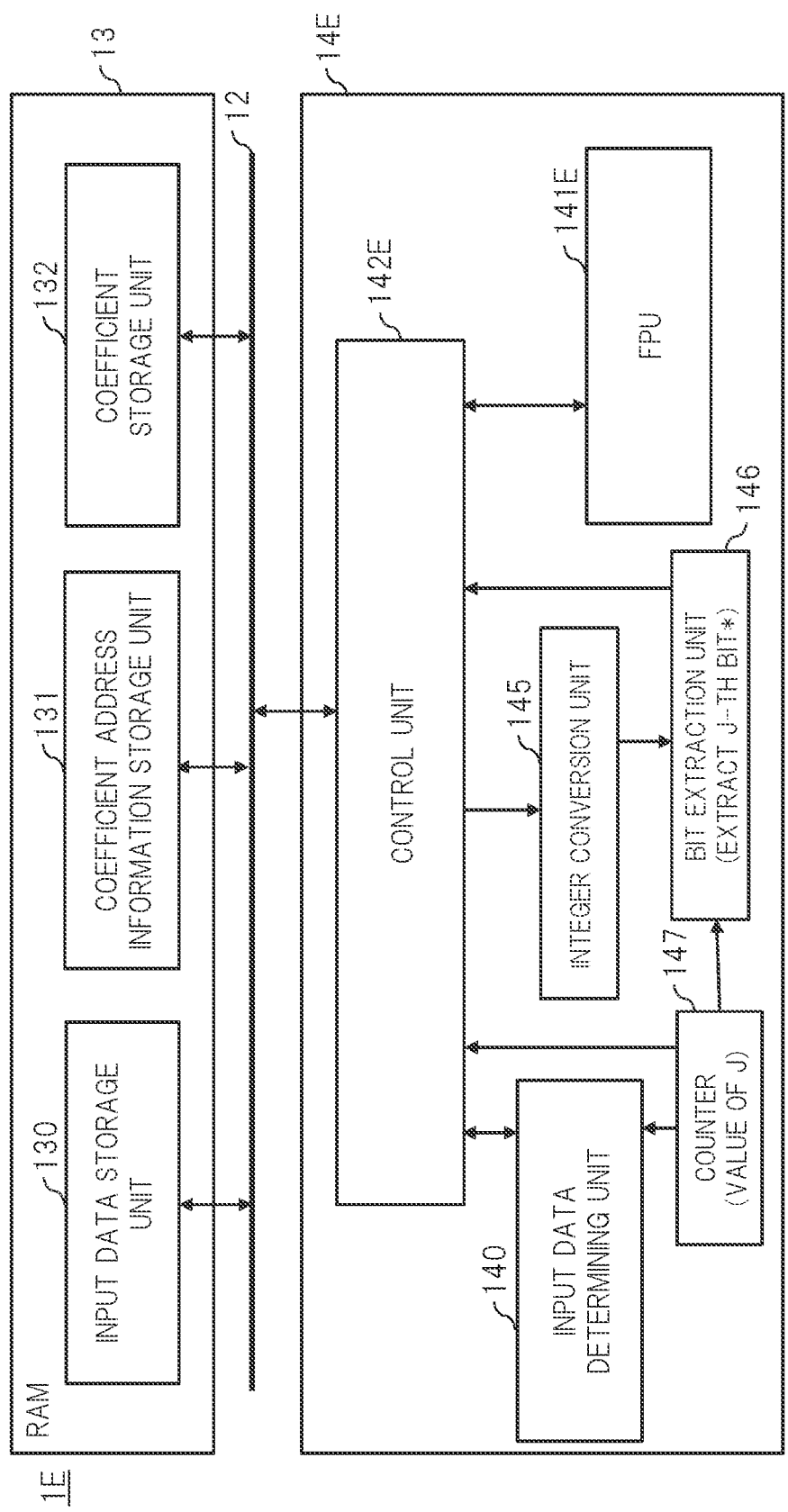
FIG. 25 is a circuit diagram showing a configuration example of an inference unit and a storage device of a data processing device according to the sixth embodiment.

FIG. 25 is a diagram showing a configuration example of an inference unit 14E and the RAM 13 of a data processing device 1E according to the sixth embodiment. The data processing device 1E according to the sixth embodiment is different from the data processing device 1 according to the first embodiment in that it further includes an integer conversion unit 145, a bit extraction unit 146, and a counter 147. In addition, the data processing device 1E according to the sixth embodiment is different from the first embodiment in that a control unit 142E and a FPU 141E are provided instead of the control unit 142 and the FPU 141, respectively. Since the configuration and operation other than those are the same as those of the data processing device 1 described in the first embodiment, the same configurations are denoted by the same reference characters, and redundant description is omitted.

With reference to FIG. 25, the integer conversion unit 145 converts the input data which is the floating-point data into a predetermined L-bit (L is a natural number) integer.

The bit extraction unit 146 extracts the bit indicated by the counter 147 from the integer data obtained by quantization by the integer conversion unit 145.

The counter 147 is a circuit for determining which bit of the integer data is processed. At the start of the multiple accumulation, the value of the counter 147 is 0, and the value is sequentially incremented by 1 until the predetermined number of bits is reached. In FIG. 25, the counter 147 increments the value of J (an integer of 0 or more) each by 1. The value indicated by the counter 147 is transmitted to the input data determining unit 140 and the bit extraction unit 146.

(Operation)

Figure 26:
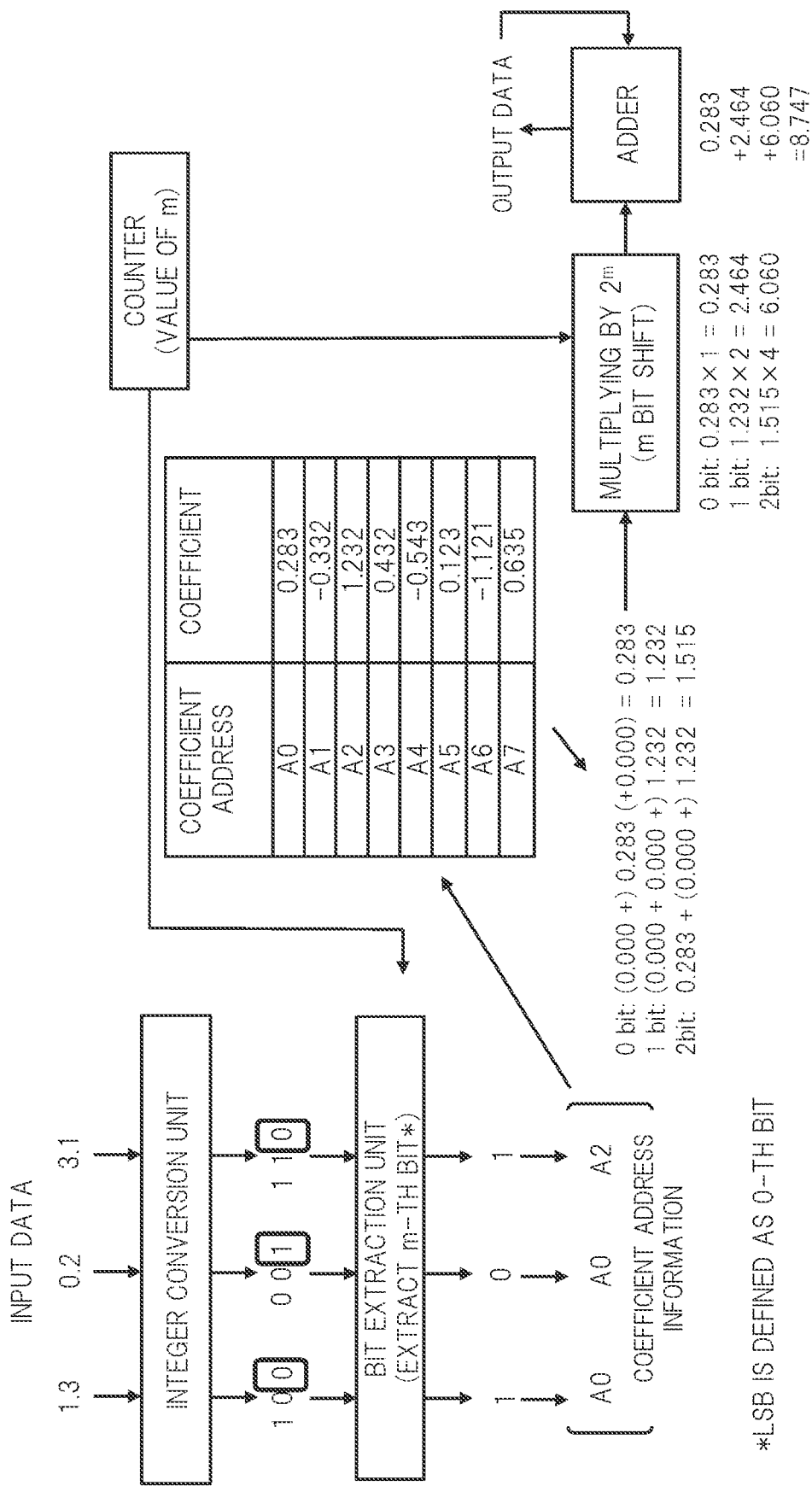
FIG. 26 is an explanatory diagram of a concept of a multiple accumulation processing performed by the data processing device according to the sixth embodiment.

FIG. 26 is a diagram conceptually showing the method of the multiple accumulation by the data processing device 1E according to the sixth embodiment. In the example of the multiple accumulation shown in FIG. 26, three input data of 1.3, 0.2, and 3.1 are stored in the input data storage unit 130. The floating-point data of 1.3, 0.2, and 3.1 read from the input data storage unit 130 by the control unit 142E are transmitted to the integer conversion unit 145. The integer conversion unit 145 quantizes the input data of 1.3, 0.2, and 3.1 to 100, 001, and 110, respectively. From the quantized integer data of 100, 001, and 110, 0, 1, and 0 corresponding to the 0-th bits which are the LSB of each of them are extracted by the bit extraction unit 146. The extracted 0, 1, and 0 are sequentially transmitted to the input data determining unit 140 via the control unit 142E.

The input data determining unit 140 acquires the coefficient address from the coefficient address information storage unit 131 based on the input 0, 1, and 0. First, the input data determining unit 140 determines that the 0-th bit of the integer 100 obtained by quantizing 1.3 is 0. The control unit 142E performs the control to omit the acquisition of the coefficient address from the coefficient address information storage unit 131 based on the determination result by the input data determining unit 140. Subsequently, the input data determining unit 140 determines that the 0-th bit of the integer 001 obtained by quantizing 0.2 is 1. The control unit 142E acquires the coefficient address A0 from the coefficient address information storage unit 131 based on the determination result by the input data determining unit 140. The control unit 142E acquires the coefficient 0.283 from the coefficient storage unit 132 based on the acquired coefficient address A0. The FPU 141E executes the cumulative addition of the coefficient 0.283. Finally, the input data determining unit 140 determines that the 0-th bit of the integer 110 obtained by quantizing 3.1 is 0. The control unit 142E performs the control to omit the acquisition of the coefficient address from the coefficient address information storage unit 131 based on the determination result by the input data determining unit 140.

Based on the information from the control unit 142E that the processing of the 0-th bit is completed, the counter 147 increments the value of J by 1. The inference unit 14E performs the processing for 0, 0, and 1 which are the 1st bits of the quantized integers 100, 001, and 110. At this time, while focusing on the fact that the value of the 1st bit of the input data is the value twice the data of the 0-th bit, the accumulation by the FPU 141E is performed. More specifically, the control unit 142E shifts the result of the J-th bit cumulative addition to the left by J bits (equivalent to multiplying by 2J) based on the value of the counter 147, and then controls the FPU 141E to perform the accumulation.

The inference unit 14E repeatedly performs the similar processing up to (L−1)-th bit. In the example of FIG. 26, L is 3 (L=3), and the inference unit 14E repeatedly performs the similar processing up to 2nd bit. In this manner, the inference unit 14E can execute the multiple accumulation to the input data quantized to multiple bits.

Figure 27:
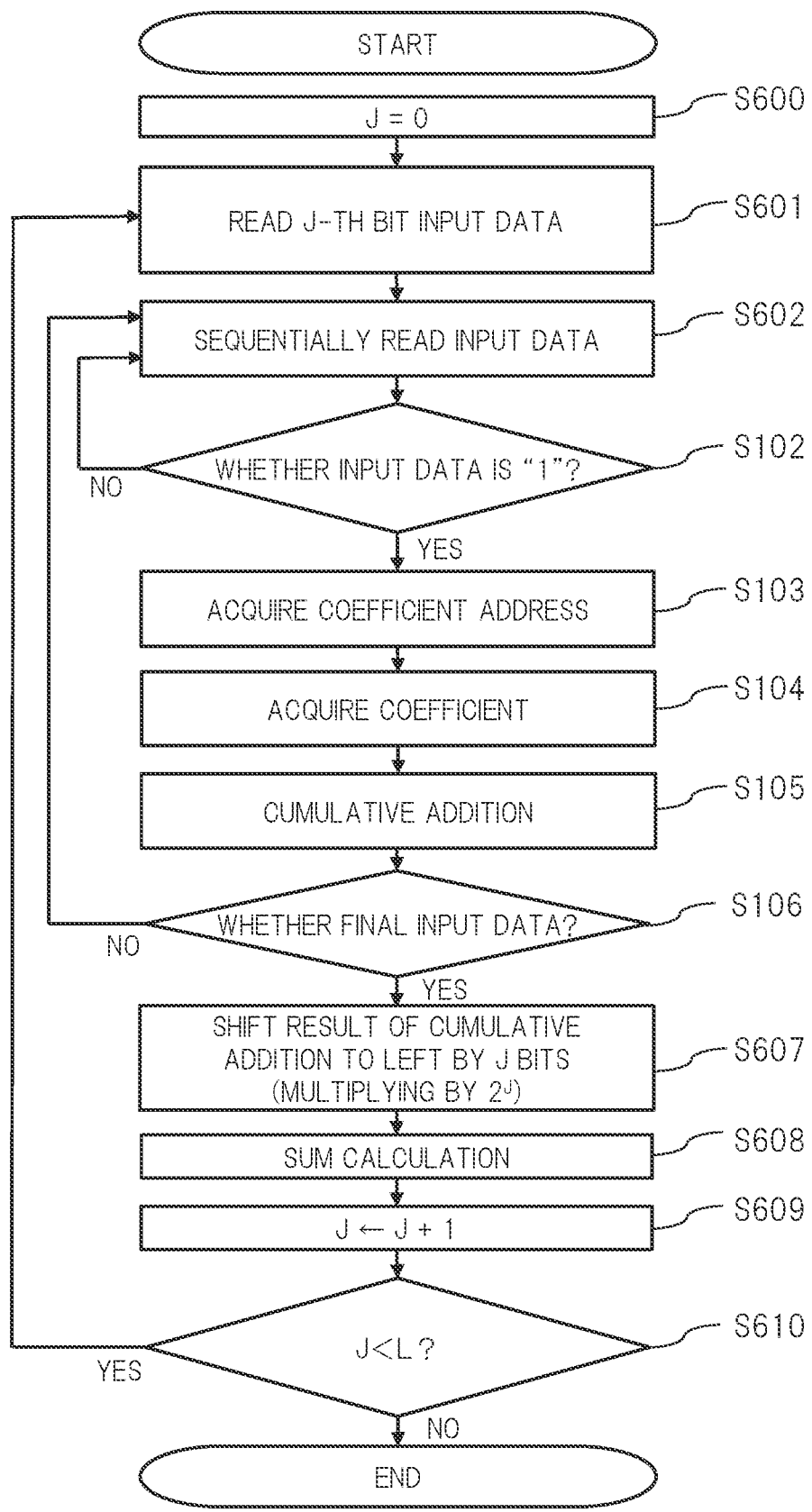
FIG. 27 is a flowchart showing an example of the multiple accumulation processing performed by the data processing device according to the sixth embodiment.

FIG. 27 is a flowchart showing an example of the multiple accumulation processing by the data processing device 1E according to the sixth embodiment. At the start of the multiple accumulation, the count value J of the counter 147 is initialized to, for example, 0 (step S600). Subsequently, the control unit 142E reads the J-th bit value of the input data quantized to multiple bits as the binarized input data from the input data storage unit 130 (step S601). The control unit 142E sequentially transmits the acquired J-th bit value as the binarized input data to the input data determining unit 140 (step S602).

When the input data determining unit 140 receives the binarized input data, it determines whether or not the binarized input data is a predetermined value (for example, 1) (step S102). When the input data determining unit 140 determines that the binarized input data is 0 (step S102: NO), the control unit 142E does not read the coefficient address from the coefficient address information storage unit 131. Then, the control unit 142E reads the next binarized input data from the input data storage unit 130 (step S602). On the other hand, when the input data determining unit 140 determines that the binarized input data is 1 (step S102: YES), the control unit 142E acquires the coefficient address from the coefficient address information storage unit 131 (step S103).

Subsequently, the control unit 142E makes a read access to the coefficient storage unit 132 based on the coefficient address acquired from the coefficient address information storage unit 131, and acquires the coefficient (step S104).

The coefficient acquired in step S104 is transmitted to the FPU 141E by the control unit 142E. When the coefficient is input, the FPU 141E executes the cumulative addition of the floating-point data (step S105). By the cumulative addition of the coefficient by the FPU 141, the multiplication processing and the addition processing for the floating-point input data and the floating-point coefficient are substituted.

After executing the cumulative addition of the coefficient by the FPU 141E, the control unit 142E determines whether or not the input data is the final input data (step S106). When the input data is not the final input data (step S106: NO), the control unit 142E reads the next binarized input data from the input data storage unit 130, and transmits the next binarized input data to the input data determining unit 140 (step S602). On the other hand, when the input data is the final input data (step S106: YES), the J-th bit multiple accumulation processing is finished. When the J-th bit cumulative addition is finished (step S106: YES), the control unit 142E instructs the FPU 141E to shift the result of cumulative addition to the left by J bits (equivalent to multiplying by 2J) (step S607). Subsequently, the FPU 141E calculates the accumulation result of up to the J-th bit by adding the cumulative addition result of the J-th bit to the accumulation result of up to the (J−1)-th bit (step S608). When the accumulation result of up to the J-th bit is calculated (step S608), the counter 147 increments the value of J by 1 (step S609). If the value of J after the incrementation is smaller than L (step S610: YES), the control unit 142E takes the J-th bit input data based on the value of J after the incrementation (step S601). On the other hand, if the value of J after the incrementation is equal to or larger than L (step S610: NO), the control unit 142E finishes the multiple accumulation to the input data quantized to multiple bits.

In the description above, the case in which the method of executing the multiple accumulation after converting the floating-point input data into an integer is applied to the first embodiment has been described, but the embodiment to which the method can be applied is not limited to the first embodiment. Namely, the method of executing the multiple accumulation after converting the floating-point input data into an integer can be applied to any of the second to fifth embodiments.

In the foregoing, the present invention has been specifically described based on embodiments, but the present invention is not limited to the embodiments described above and various modifications can be made without departing from the gist of the invention. For example, it is possible to combine the fourth embodiment with the third embodiment.

What is claimed is:

1. A data processing device comprising:
a processor; and
a first memory storing instructions that, when executed by the processor, cause the processor to:
determine whether or not each of binarized input data is a predetermined value;
store, in a second memory, a plurality of coefficients and coefficient address information including information related to coefficient addresses where the plurality of coefficients are stored;
read the coefficient address from the second memory based on a determination result of the binarized input data being the predetermined value or not and read the coefficient from the second memory based on the coefficient address; and
execute an arithmetic operation related to the acquired coefficient.

2. The data processing device according to claim 1, wherein the processor executes a cumulative addition of the acquired coefficients.

3. The data processing device according to claim 1, wherein the processor reads the coefficient address based on the determination result of the binarized input data being the determining value or not.

4. The data processing device according to claim 1, wherein the coefficient address information includes 1×N (N is a natural number larger than 1) coefficient addresses.

5. The data processing device according to claim 1, wherein the coefficient address information includes M×N (M and N are natural numbers larger than 1) coefficient addresses.

6. The data processing device according to claim 1, wherein the processor is further configured to count the number of times each of the coefficient addresses is acquired, and
wherein the processor executes a multiple accumulation based on the number of times each of the coefficient addresses acquired and the coefficient.

7. The data processing device according to claim 1, wherein the binarized input data includes two values of a positive value and a negative value, and the coefficient address information includes a first coefficient address corresponding to the positive value and a second coefficient address corresponding to the negative value.

8. The data processing device according to claim 7, wherein, when the binarized input data is the positive value, the processor reads the first coefficient address, and when the binarized input data is the negative value, the processor reads the second coefficient address.

9. The data processing device according to claim 1, wherein the processor adjusts values of the plurality of coefficients based on the coefficient address included most in the coefficient address information, and the processor executes a cumulative addition of the plurality of adjusted coefficients.

10. An operating method of a data processing device having an arithmetic unit and a memory, the method comprising:
a step of determining whether or not binarized input data is a predetermined value;
a step of storing a plurality of coefficients and coefficient address information including information related to coefficient addresses where the plurality of coefficients are stored, in the memory;
a step of reading the coefficient address from the memory based on a determination result of the determining step;
a step of reading the coefficient from the memory based on the coefficient address; and
a step of executing an arithmetic operation based on the read coefficient by the arithmetic unit.

11. The operating method of the data processing device according to claim 10,
wherein the step of reading the coefficient address includes a step of reading the coefficient address based on a determination result that the input data is the predetermined value, and the step of executing the arithmetic operation further includes a step of executing cumulative addition of the coefficients acquired by the step of reading the coefficient.

12. The operating method of the data processing device according to claim 10,
wherein the determining step further includes a step of determining whether or not each of N (N is a natural number larger than 1) binarized input data is the predetermined value, and the step of reading the coefficient address further includes a step of reading 1×N coefficient addresses.

13. The operating method of the data processing device according to claim 10,
wherein the step of reading the coefficient address further includes a step of reading M×N (M is a natural number larger than 1) coefficient addresses.

14. The operating method of the data processing device according to claim 10, further comprising a step of counting the number of times each of the coefficient addresses is acquired,
wherein the step of executing an arithmetic operation further includes a step of executing a multiple accumulation based on a count result of the counting step and the plurality of coefficients.

15. The operating method of the data processing device according to claim 10,
wherein the determining step further includes a step of determining whether or not the binarized input data having a positive value or a negative value is the predetermined value, and the step of reading the coefficient address further includes a step of reading a first coefficient address when the binarized input data is the positive value and a step of reading a second coefficient address when the binarized input data is the negative value.

16. The operating method of the data processing device according to claim 10, further comprising a step of adjusting values of the plurality of coefficients based on a coefficient address included most in the coefficient address information,
wherein the step of executing an arithmetic operation further includes a step of executing a cumulative addition of the plurality of adjusted coefficients.

17. The operating method of the data processing device according to claim 10,
wherein the step of executing an arithmetic operation further includes a step of executing a multiple accumulation required for an inference processing of a neural network.

18. The operating method of the data processing device according to claim 10,
wherein the determining step further includes a step of determining whether or not each of the plurality of binarized input data constituting multi-bit data is a predetermined value, and the step of executing an arithmetic operation further includes a step of shifting an arithmetic operation result by the step of executing an arithmetic operation based on a bit position of the binarized input data in the multi-bit data.

19. A non-transitory computer readable storage medium storing a program related to a neural network model executed by a data processing device having a CPU and a memory, the computer readable storage medium storing the program causing a computer to execute processing comprising:
a step of determining whether or not each of binarized input data is a predetermined value;
a step of storing a plurality of coefficients and coefficient address information including information related to coefficient addresses including addresses where the plurality of coefficients are stored, in the memory;
a step of reading the coefficient address from the memory;
a step of reading the coefficient from the memory based on the coefficient address; and
a step of executing a cumulative addition of the read coefficient.

20. The non-transitory computer readable storage medium storing the program according to claim 19,
wherein the step of reading the coefficient address further includes a step of reading the coefficient address based on a determination result of the determining step that the input data is the predetermined value.

\* \* \* \* \*